US008303404B2

(12) United States Patent
Kirsch

(10) Patent No.: US 8,303,404 B2

(45) Date of Patent: Nov. 6, 2012

(54) PLAYING CARD IDENTIFICATION SYSTEM

(75) Inventor: Daniel Kirsch, North Las Vegas, NV (US)

(73) Assignee: Electronicard Corp., North Las Vegas, NV (US)

( * ) Notice: Subject to any disclaimer, the term of this patent is extended or adjusted under 35 U.S.C. 154(b) by 0 days.

(21) Appl. No.: 13/339,702

(22) Filed: Dec. 29, 2011

(65) Prior Publication Data

US 2012/0100901 A1 Apr. 26, 2012

Related U.S. Application Data

(60) Division of application No. 11/762,324, filed on Jun. 13, 2007, which is a continuation-in-part of application No. 11/462,969, filed on Aug. 7, 2006, now abandoned.

(60) Provisional application No. 60/706,085, filed on Aug. 5, 2005.

(51) Int. Cl.
*A63F 9/24* (2006.01)
*A63F 13/00* (2006.01)

(52) U.S. Cl. ................ 463/29; 463/12; 463/13; 463/25; 463/46; 463/47

(58) Field of Classification Search .................... 463/12, 463/25, 29, 46, 13, 47
See application file for complete search history.

(56) References Cited

U.S. PATENT DOCUMENTS

2004/0207156 A1* 10/2004 Soltys et al. .................. 273/292
2005/0026683 A1* 2/2005 Fujimoto ........................ 463/29

* cited by examiner

*Primary Examiner* — Peter DungBa Vo
*Assistant Examiner* — Jasson Yoo
(74) *Attorney, Agent, or Firm* — Louis Ventre, Jr.

(57) ABSTRACT

A radio frequency card tracking system for a gaming table includes a system computer, a deck of playing cards, one or more table antennas, and a transceiver. Each playing card has an antenna, a card identity, and a transponder. Each table antenna has a detection zone at a dealer's card placement position and/or at locations at a gaming table and can transmit and receive radio-frequency signals to and from a card located within the detection zone. The transceiver is coupled with the table antenna and the system computer to provide radio-frequency-energizing signals to the table antenna for transmission to the card located within the detection zone. The transceiver receives card identifying signals from the table antenna and transfers these signals to the system computer. The system computer recognizes the signal duration, receives card identifying signals; determines the card identity associated with the signal, and determines the location of the card.

8 Claims, 19 Drawing Sheets

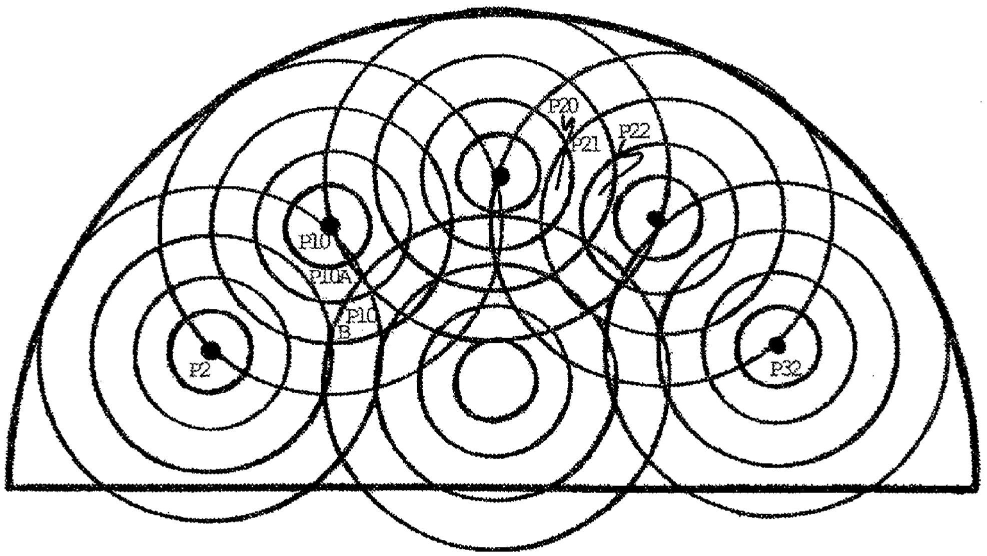
FIG.14A
FIG.14B
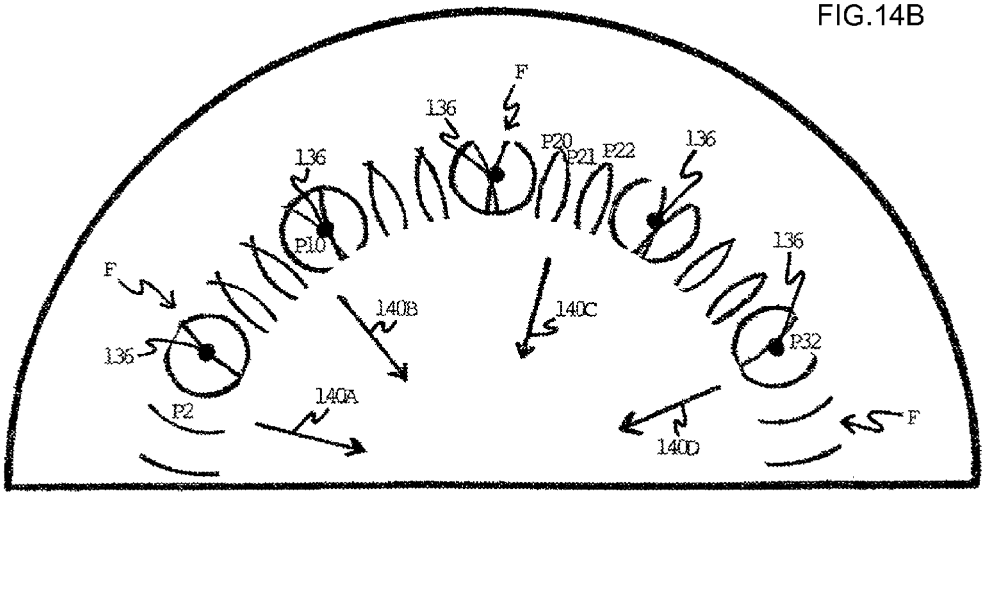

PLAYING CARD IDENTIFICATION SYSTEM

CROSS-REFERENCE TO RELATED APPLICATIONS

This application is a divisional of application Ser. No. 11/762,324, filed 13 Jun. 2007, which is a continuation-in-part of application Ser. No. 11/462,969, filed 7 Aug. 2006, which claims priority to Provisional Application No. 60/706,085, filed 5 Aug. 2005, all of which are hereby incorporated by reference as if set forth herein.

TECHNICAL FIELD

The present invention relates generally to gaming tables. More specifically, the present invention relates to a smart table employing radio frequency (RF) technology. The present invention further relates generally to card identification, and more specifically to card identification in the field of gambling.

BACKGROUND

The present invention relates to a radio frequency enabled blackjack table which can detect transponder imprinted playing cards as they are dealt to the players and dealer, and as they are placed face-up on the table in front of the player's betting area and face-up on the table in front of the dealer.

The system is able to register and record each card dealt and accurately display each player's hand and the dealer's hand on a monitor screen in real time during an ongoing card game. The system may also calculate the favorability of the remaining un-dealt cards at a specific Blackjack table, or any other betting calculation. The system may make a calculation as to the profitability of a hypothetical wager by a player, such as one dollar, as well as analyze a player's actions and gaming skills. The present invention allows card activity on every blackjack table in the casino to be monitored by security personnel. Card activity at a plurality of tables located within a specific area, or pit, can be monitored by the system and displayed at the pit boss's computer/monitor work station, or at any other game monitoring area.

The present invention uses wireless RF technology to identify each card in a deck of playing cards. RF transponders can be imprinted on at least one surface of a playing card, and an antenna mounted under or in the gaming table can be used to detect a card's rank and/or suit when the card is placed on the table over the antenna.

In the past, "RFID tags" have been applied to playing cards using a silicon microchip and antenna embedded within a paper sticker, or envelope. This technique was published in October of 2002, in a Swiss publication, the "Springer/ACM Personal and Ubiquitous Computing (PUC)", Vol. 6 No. 6, pp. 371-378. It is entitled "Smart Playing Cards: A Ubiquitous Computing Game", and its entire contents are incorporated by reference herein. The publication can also be found on the internet at: www dot inf dot ethz dot ch/personal/roemer/publications dot html In order to monitor a card game (the game of "Whist"), RFID "stickers" were attached to playing cards and a single antenna was placed under a card table, which was connected to an RFID transceiver, computer, and monitor screen. As each card was placed on the gaming table and into the antenna detection area, that card's rank and suit would appear on the monitor screen at the appropriate indicated player position. These RFID stickers are not practical in an actual casino environment because the sticker would be detectable by the patrons and the microchip would create an obtrusive hump at that spot on the card. What is needed in the art is a technique of applying an RF transponder that is both unobtrusive and undetectable by the patron, and therefore less intimidating to the patron. Additionally, this sticker system would cost at least $1.00 per card, thus making the manufacturing cost for just one deck to be over $50.00.

While the present invention may be applied to practically any casino card game, it is especially helpful when applied to Blackjack. In the game of Blackjack, two cards are initially dealt to the players and to the dealer. In most Blackjack games, the players are allowed to initially pick up and hold their two originally dealt cards. It is the object of the game for each player, as well as the dealer, to try and achieve a total hand value as close to 21 as possible without exceeding a total value of 21. Initially, the players place a wager and each player plays his hand against the dealer's hand. The winner is the one with the hand adding up to the highest denominational value without exceeding a value of 21. When a player does exceed a hand value of 21 through the process of drawing cards from the dealer, the player automatically busts and loses. His cards and bet are then picked up by the dealer. When both the player and the dealer exceed a hand value of 21, the dealer wins the players bet since the player draws cards before the dealer draws cards, thereby resulting in the player's bet being picked up before the dealer has a chance to bust.

After the dealer plays his hand or busts in the process, the winning players' bets are paid, generally an amount equal to the amount wagered. Therefore, according to the rules of the game, the dealer receives a substantial built-in advantage. In order to offset this advantage, the players are allowed several options. When a player is satisfied with the value of his hand, he may stand by placing his original two cards face-down on the table next to his bet or with one corner of his cards tucked beneath his bet. A player may also hit or draw an additional card from the dealer and continue drawing cards until he busts, while the dealer typically must stop drawing cards when he achieves a hand value of 17 or more. A player also has the option to double-down by placing his two original cards face-up in front of his betting area and doubling his bet.

Another option available to the player is the option to split two cards of the same denomination into two or more hands. For example, a player who is dealt two original cards of the same denomination, such as two 8's, has the option to play the two cards as one hand, with a total value of 16, or divide the two cards into two hands, each with an initial value of 8. Each time a player splits, another bet must be placed within the betting area, matching the player's original bet. If after splitting two cards of the same denomination one or both of the two succeeding cards dealt to the player is also a card of the same denomination, such as an eight in this example, the player has the option of splitting one or both cards, forming the basis of a third or fourth hand. When a player splits his hand, his cards are separated and placed next to each other, side by side, in front of the player's betting area. Additional cards are placed on top of the split cards. On occasion, a player's hand might require as many as nine or ten cards to obtain a total hand value close to 21. Thus a row of cards may be manifested on top of each initially split card.

In the past, a single radio frequency antenna has been proposed to be placed at the area of the gaming table where the cards may land during the initial deal, or directly in front of the player. One problem that might arise using a single antenna placed directly in front of the player is that after a player picks up his cards, he may then set them back down for various reasons, only to pick them back up again. When the player decides he does not need to draw additional cards, he may again place the cards on the table within the antenna's detection zone. When the player doubles-down or splits, the antenna system will again read the player's same original two cards as they are placed on the gaming table over the player's antenna. Additionally, a player may place his two original cards on the table over the previously proposed single antenna area located directly in front of the player while asking the dealer for additional cards by the use of hand gestures. Again, a problem arises in that the previously proposed single RF antenna systems cannot determine the intended gaming purpose of the two cards detected within its detection zone. They cannot determine whether the two cards placed on the table are meant as a double-down, a split, or a signal that the player is standing. If a player is giving hand gestures while asking for additional cards, the two cards may be detected by the system.

SUMMARY

The present invention incorporates a radio frequency transponder imprinted on at least one surface of each card in a deck of playing cards, preferably using typical lithographic printing equipment. These imprinted tags can bring the price of each transponder imprinted on each card in a deck of cards to below 1 cent per card, or as little as 50 cents per deck.

In a preferred embodiment, the technology used to imprint RF transponders on the playing cards of the present invention is disclosed in U.S. Pat. No. 6,819,244, entitled "Chipless RF Tags" with an alternate method being disclosed in U.S. Pat. No. 6,922,146, entitled "Radio Frequency Data Carrier and System for Reading Data Therein." These types of RF tags are both chipless, as they do not require a silicon microchip to function. They can be printed on the card substrate in thin layers, and through a chemical dipping process, electronic circuitry and antenna can be formed on the substrate. A lacquer coating can be applied over the circuitry and antenna. Over that coating, the face or back indicia can be printed. Finally, a typical final protective coating may be applied to the card substrate before it is cut to card dimensions and packaged.

The RF tags in U.S. Pat. No. 6,819,244 do not store information about the article to which they are applied. Rather, the tag's dye layer emits light in response to a voltage signal induced in a conductive path on the tag. A photodiode on the tag then receives the emitted light and converts it into an electrical signal, which is then transmitted by the tag's antenna as an RF signal. In the present invention, these transmitted RF signals may be interpreted by the computer to identify the cards by comparing the responding RF signals to a predetermined list of RF signals associated with the cards. In this fashion, the tags may be used to identify the cards without actually storing or transmitting any identification information themselves. The identity of the cards may be held within the computer, rather than within the card itself. In the present invention, this chipless RF tag mimics the incoming modulated RF signal from the antenna on the gaming table, alters the intensity characteristics of the signal, and transmits the altered signal as a return signal to the antenna on the gaming table. Since this type of tag requires less surface area on the card than a data carrying or data responding "thin-film transistor" type tag, there is enough room on the card to apply two transponders, or even three.

The present invention solves the problem of determining whether or not a player is doubling-down or splitting by incorporating within its design four detection zones located side by side at each player's position. This design is able to detect the number of hands being played by a player in a split situation, and since up to four cards may be split forming four hands, this four detection zone system is able to determine to which hand additional cards are being dealt. Furthermore, the total value of each split hand may be ascertained as well.

Therefore, the system will be able to determine whether or not a player is splitting, doubling-down, drawing cards, standing, etc., by the placement of the player's two original cards back into the player's card detection zone, by the placement of the cards over one or more antennas on the gaming table, by the length of time that a card is present at a specific location, and by the dictated rules of the game. For example, when a player's hand value exceeds 21, he may place his original two cards face up in front of his bet, and within his antenna's detection zone. The system would be able to determine that the two additional cards detected are the result of the player busting by adding up the detected cards at the player's antenna position.

The present invention has the ability to monitor an ongoing casino card game and instantaneously register and record card activity for a gaming table and display the activity on a monitor screen. The system can determine the location of cards being held by the participants above and below the gaming table, and track their movement in real time. The system of the present invention may also be programmed to make certain betting calculations and relay that information to casino personnel.

The present invention allows casino personnel to identify card counters, advantaged players, and other undesirable patrons. The casino may at that time elect to ban the undesirable patron from playing the game at that establishment, or take some other action in order to protect the assets of the casino enterprise.

The present invention provides a gaming table that automatically checks to make sure that all the cards in the deck are present by placing the deck on certain areas of the gaming table. This automatic check can be performed at certain times, including, but not limited to, when the dealer shuffles a single deck, when the dealer shuffles multiple decks, when multiple decks are put into a card shoe, and when the cards are placed on the discard pile. The present invention also enables the pit boss and casino personnel in the back room to check to make sure that all of the cards are present in the deck.

BRIEF DESCRIPTION OF DRAWINGS

FIG. 14A is illustrates a multitude of detection zones being manifested from the overlapping transmission areas emanating from the gaming table in accordance with the present invention.

FIG. 14B illustrates an overlay of FIG. 14A that focuses on a specific semicircular section of the gaming table.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

FIGS. 1-12 illustrate exemplary embodiments of the components of smart table system 2, with like components numbered alike.

Figure 1:
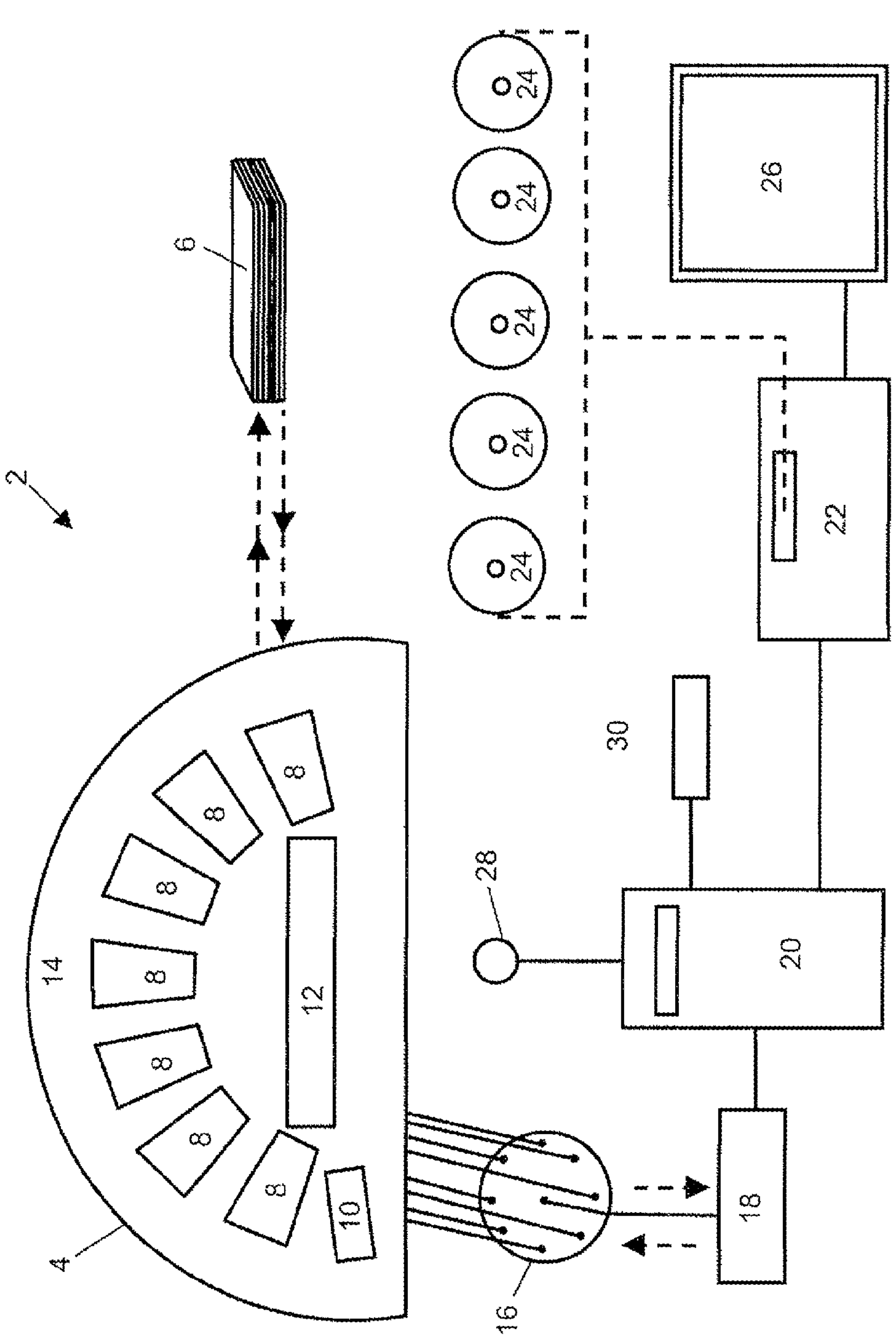
FIG. 1 illustrates an exemplary embodiment of a smart table system for RF playing cards in accordance with the present invention.

FIG. 1 shows an exemplary embodiment of an RF enabled blackjack gaming table system 2, which is to be used in a casino environment. System 2 may comprise gaming table 4, a deck of RF imprinted playing cards 6, a multiplexer 16 connected to table 4, transceiver 18 connected to multiplexer 16, system computer 20 connected to transceiver 18, casino's master computer 22 connected to system computer 20, and monitor screen 26 connected to master computer 22. Computers 20 and 22 may comprise a processor and a program storage device readable by the processor, such as memory or a CD-ROM 24. The program storage device may tangibly embody a program of instructions, or software, executable by the processor for performing the functions of the computers described below.

The present invention is enabled by the imprinting of an RF tag or transponder on at least one surface of all 52 cards in a deck of playing cards 6, giving each card the ability to send back its own unique identifying radio frequency signal in response to a particular energizing radio frequency transmission originally emanating from the system's transceiver 18. Transceiver 18 can be powered by 12-24 volt direct current. It converts that energy to a radio frequency signal typically in the 13.56 mHz range. Also, printed computer circuits on each card may have an anti-collision algorithm, so that the cards will be less likely to interfere with each other.

Gaming table 4 comprises an antenna system that can incorporate a plurality of RF transmitting/receiving antennas, forming detection zones such as shoe detection zone 10, dealer detection zone 12 and player detection zone 8. This antenna system may be disposed under or inside gaming table 4. Transceiver 18 may be connected to this antenna system by an insulating coaxial cable or by other suitable means.

When several antennas are used in gaming table 4, multiplexer 16 may be used, separating the signal from transceiver 18 in a plurality of ways. FIG. 1 shows multiplexer 16 separating the signal in eight different ways. Transceiver 18 can send up to 1000 RF signals a second (or less, depending on the unit). Multiplexer 16 also has the ability to send out 1000 signals per second, consecutively, one signal after another, from one antenna location (such as one of the player zones 8) to another (such as dealer zone 12).

Therefore, a table system with 8 antenna locations, which sends out 1000 signals a second, would have about 125 readings (1000 divided by 8) by transceiver 18 every second at each antenna location. Each of the eight contacts on multiplexer 16 may be connected by an insulating coaxial cable, or other suitable means, to an individual antenna for the detection zones 8, 10 and 12 on gaming table 4.

Each of the eight connections on multiplexer 16 can be further divided by attaching eight additional multiplexers (not shown) to the system, one additional multiplexer attached to each of the eight outlet ports on multiplexer 16. Each of the eight outlet ports on the eight multiplexers could be attached to antennas under the gaming table 4, giving the system a potential of using 64 antennas (8 times 8) in gaming table 4 for each transceiver 18 that is used. Thus, a system with 64 antennas using a single transceiver would have about 15.6 readings (1000 divided by 64) every second at each antenna location.

Therefore, approximately every 1/1000 of a second, transceiver 18 sends a radio frequency signal to multiplexer 16, which relays that signal to an antenna located on gaming table 4. The antenna then transmits that energizing signal to the cards. The cards, each of which has an RF transponder imprinted on its surface and is present at a particular location, pick up that energizing signal and transmit a response back through the antenna located at that position on gaming table 4. As multiplexer 16 switches electronically from one contact to another, a signal is sent out by transceiver 18 and received by the cards located at that particular location at gaming table 4, and a unique identifying response is sent back by each card at that location. Location information, received from the cards at individual locations at gaming table 4, is transferred from transceiver 18 to system computer 20 at a rate of up to 1/1000 of a second. System computer converts that 1/1000 of a second time recognition input to a time recognition output of about 1/1000 of a second, or about as fast as the cards can be dealt. Thus, system computer 20 tabulates the number of return responses from the cards every ¼ of a second and transfers that information to the casino's master computer 22 at intervals of at least every ¼ of a second.

The cards may be imprinted with shifting antennas on the surface of each card, allowing each transponder's antenna to be positioned so as to receive and transmit radio frequency energy without being obstructed by radio frequency blocking circuitry and antenna imprinted on the other cards in the deck, such as when cards are stacked one on top of another. With this antenna design, the cards can be read by system computer 20 one at a time or all at once.

In a shoe game, special decks of 416 cards need to be printed in such a manner that at least part of the antenna of each card would not be blocked from the metallic ink on the other cards. Also, printed computer circuits on each card may have an anti-collision algorithm, so that the cards will be less likely to interfere with each other.

These cards are intended to be used in a live casino card game on a gaming table in which radio frequency sending/receiving antennas for detection zones 8, 10 and 12 have been placed.

Shoe detection zone 10 comprises an antenna mounted under or in the table having the ability to read all of the cards in an ordinary casino shoe simultaneously up to every 1/1000 of a second. In a complete eight deck shoe, 416 cards will be utilized (8×52). Each card in the deck 6 is imprinted with an RF transponder, allowing each card to transmit a unique identifying signal back to the transceiver. In an eight deck shoe, 416 different transponders, each structured to transmit a return signal in a unique and identifiable way, is utilized, such as in U.S. Pat. No. 6,819,244 entitled "Chipless RF Tags." When a card is removed from the shoe, system 2 only senses the cards remaining within the shoe and not the card previously removed from the shoe.

In order for system 2 to determine a card's absence from a particular detection zone, comparative software 24 must be installed in the system computer 20, preferably via the casino's master gaming computer system 22. This comparative software 24 registers each unique return response signal received from the transponder imprinted cards at a particular antenna location at a specific time within the system computer 20, which in turn compares each unique return response with a pre-programmed list of potential transponder responses, which is determined by the number of cards required for a particular table or for a particular casino card game. For example, an eight deck shoe would require 416 different unique return responses to be transmitted by the 416 cards. A single-deck blackjack game would require only 52 unique return response transponders to be imprinted on the cards, thereby requiring a pre-programmed recognition of 52 different unique return response RF signals in a single-deck blackjack game for system computer 20.

When comparative software is introduced into the system computer 20, a determination of a card's identity can be made directly after being removed from the shoe. Thus, cards being dealt from an ordinary casino shoe onto an RF enabled card table 4 can be determined by the system computer 20 and displayed on a monitor screen 26.

Figure 2:
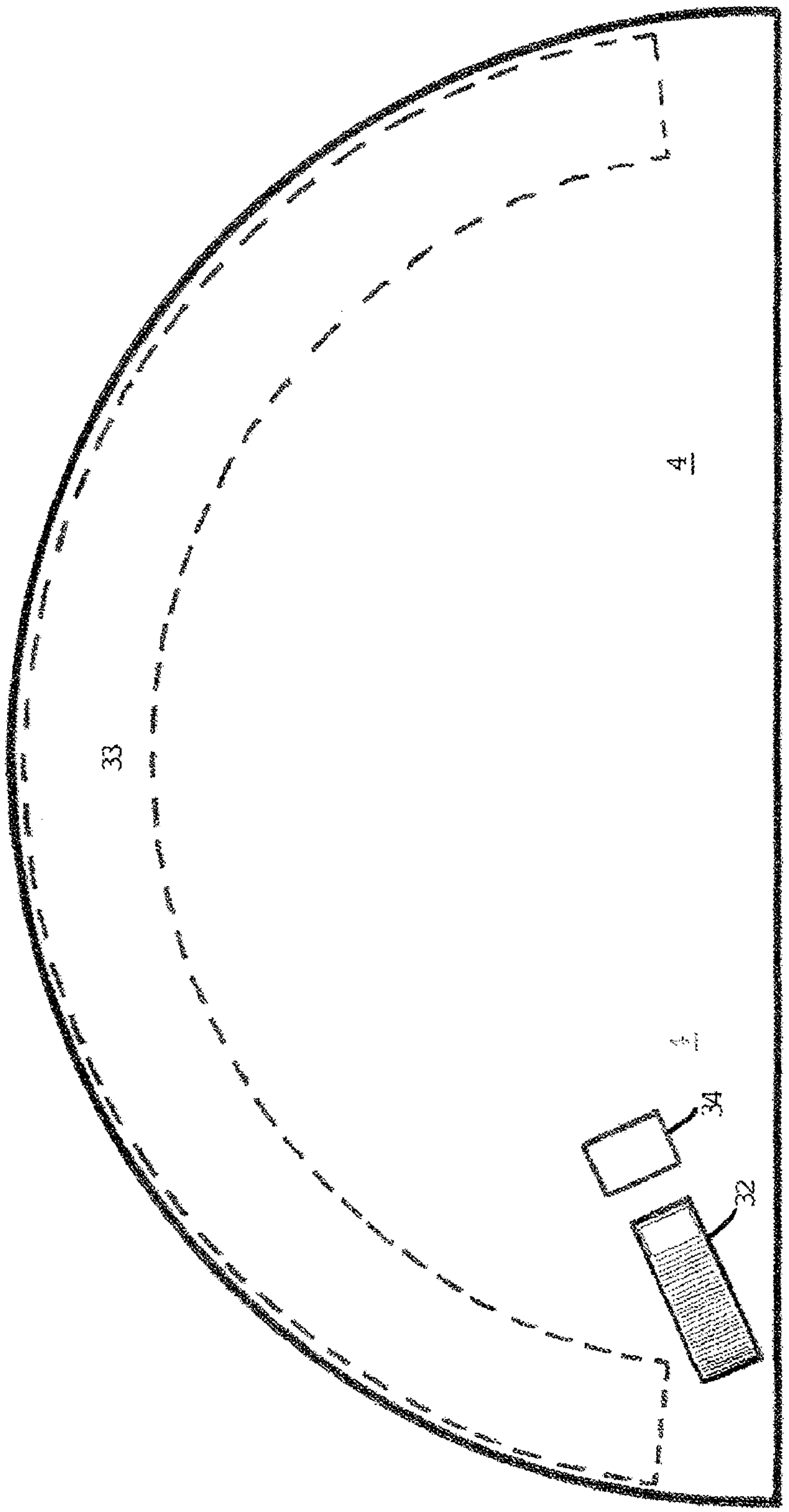
FIG. 2 illustrates another exemplary embodiment of a smart table system for RF playing cards in accordance with the present invention.

An alternative method of reading the cards in the shoe is to shorten the antenna for shoe detection zone 10 and place a normal casino dealing shoe a couple of inches behind it. This antenna configuration is shown in FIG. 2 where the shoe 32 is positioned so that when a card is removed from the shoe and slid across the felt to its destination or card receiving area represented by zone 33, antenna 34 located within the gaming table 4 is able to read each card's identity and thus determine its numerical value and/or suit.

In FIG. 1, antenna area 12 represents the dealer's card detection area. This antenna may be made up of several antennas linked together, giving the system the ability to detect the dealer's hand (those cards placed flat on the table in front of the dealer). The elongated design of the dealer's antenna area 12 is desirable since as many as ten cards may be required for the dealer to form a hand with a numerical value of seventeen or more as dictated by the rules of Blackjack.

Another intended purpose of this long or multi-antenna design is so that the system will be able to read all of the cards as they are being spread across the table 4, as when being visually checked for completeness by the dealer and spectators before a new deck is introduced into a casino card game. This elongated antenna/antennas layout has the ability to perform an automatic deck check, thus determining if all of the cards are present. A digital display or LCD screen can tell the dealer when things are amiss, when to shuffle, what cards are missing from the deck, and who they were dealt to. The Smart Table 2 can incorporate a "turn-on" switch, preferably on the intermediate computer (H), and also have a manual "Blackjack call" switch.

The dealer's antenna area 12 can also function as a card dealing sensor, sensing a cards identity as the cards are being dealt from a single or double handheld deck or decks.

Figure 3:
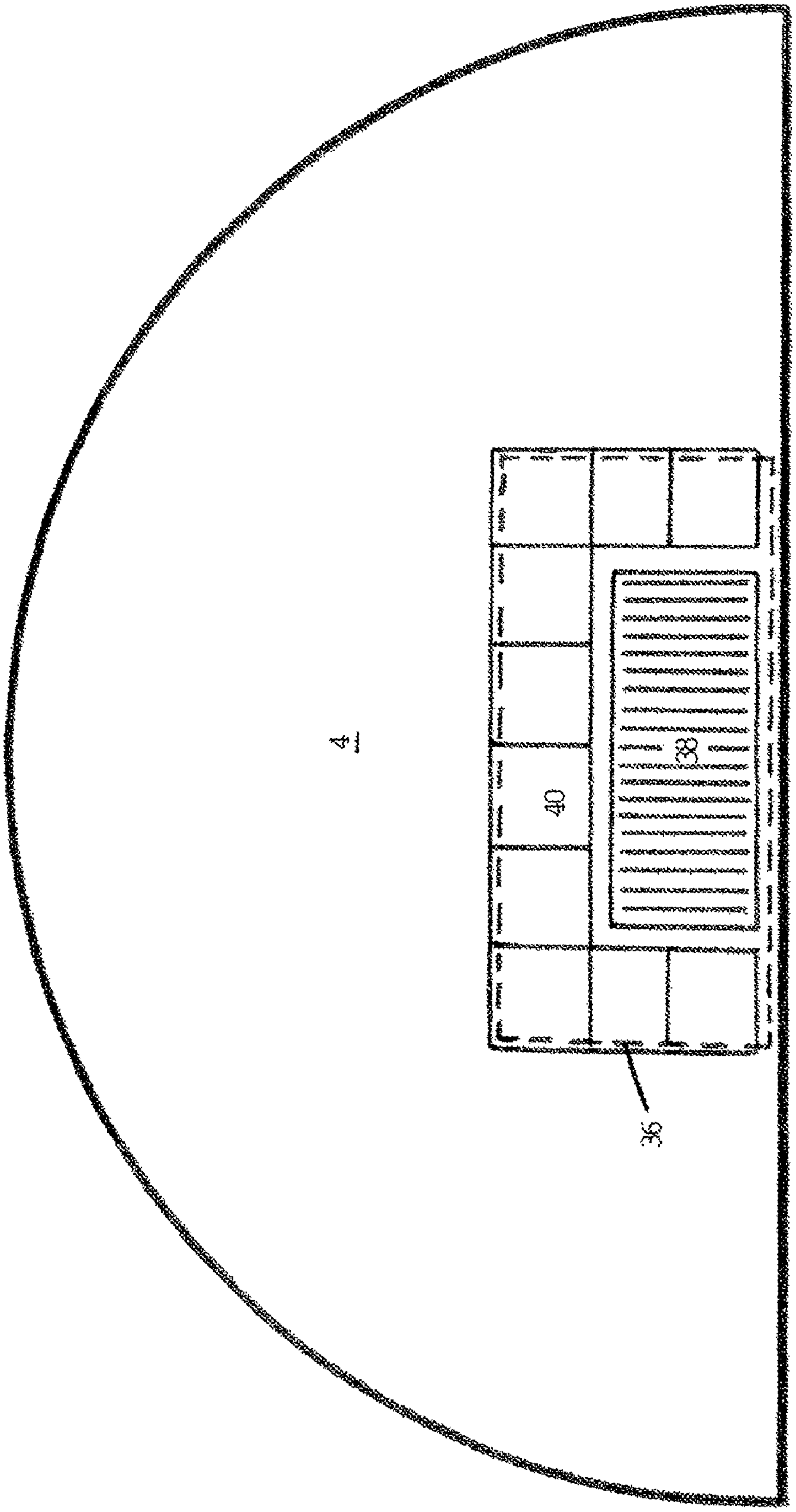
FIG. 3 illustrates yet another exemplary embodiment of a smart table system for RF playing cards in accordance with the present invention.

FIG. 3 shows that a long card detection area, such as the dealer's card detection area 40, may be made up of several antennas located under or in the gaming table. Alternatively, they may wrap around the chip tray area 38. These detection zones 40 may form a square, rectangle, arch, half circle, or other geometric shape, as long as they are able to detect all of the cards dealt from the dealing area 36 to all of the players seated at the gaming table, as well as the dealer's hand consisting of the cards placed flat on the table on antenna detection areas 40.

With this antenna configuration, it is possible for the dealer's card detection area, consisting of the ten rectangular areas 40 in FIG. 3, to detect a card's identity as it is being dealt to the players, including those players located at the sides of table 4 from a hand-held deck by the dealer when dealing from a position just above the chip tray area 38. This antenna configuration of FIG. 3 will allow the dealer to deal the cards from anywhere within area 36.

When dealing from a position over the chip area 38 or behind the ten rectangular area 40, it is possible for each card to be sensed by an individual antenna 40 as it is being dealt over that particular antenna detection zone. It is noted that with this antenna configuration, it is not a requirement for the number of antenna detection areas to necessarily correspond to the number of player positions at a gaming table. In the manner illustrated, the antenna system has the ability to determine the order or player position to which a card is being dealt and to which side of the table a card is being dealt, and to register and record that information with the system computer 20. It can also display that information on a monitor screen 26.

However, when dealing from a position within one of the dealer's antenna detection zones 40, the previously mentioned comparative software must be employed for the system to determine the cards' identities as they are removed from the deck 6 one by one in a hand-dealt casino card game. Therefore, in order for the dealer's antenna system to monitor a casino card game, it must have software introduced allowing it to alternate between the application of the comparative software principle and a detection-based, or event-based, program.

A preferred method of identifying the cards as they are dealt from a position within detection zones 40 is for the system to read the cards one-by-one as they are removed from the deck/decks that the dealer is holding. A radio frequency signal-blocking cut-card could be used to block signals from the table antenna to the cards in the deck, since the cut-card always ends up at the bottom of the deck after the deck is "cut" with the cut-card by a participant. Since the cut-card will block the signals to the transponders located on the cards that the dealer is holding, a single card can be read as that card is pushed off of the top of the deck by the dealer when it is being dealt.

The plastic material from which the cut-card is constructed may be made up of an RF signal blocking material, or an RF signal blocking material may be laminated between two plastic substrates. Identical transponders and antenna may be imprinted on both plastic substrates so that the cut-card could be used up-side-up or up-side-down as it is inserted in the deck. The transponder ending up on the bottom of the cut-card will be able to send and receive RF signals, thereby identifying the deck in the dealer's hand, while the RF barrier laminated within the cut-card prevents RF transmissions emanating from the table antenna from being able to energize the transponders on the playing cards in the remaining deck that is being held by the dealer.

In a preferred embodiment, the cut card can be made of a material having RF absorption capabilities, such as an electromagnetic field suppressor, with identical transponders imprinted on each side of the card. One example of such an electromagnetic field suppressor is found in U.S. Pat. No. 6,514,428, the contents of which are hereby incorporated by reference as if set forth herein. It can function as a barrier by absorbing radio waves from 10 MHz to 100 GHz.

In many casino games, cards are dealt one-by-one to the players and to the dealer, from a hand held deck, in order to form hands for the players and the dealer. The proposed system can determine and display these hands on a monitor screen, especially in casino games where the dealing process is a known constant. For instance, in many games, cards are dealt in a clockwise fashion until each participant has two cards. With the proposed system, when a card is dealt to a player, a return signal from the transponder on that card would be received by the transceiver for just a fraction of a second as that card is being dealt. But when the dealer receives his card, which is laid on the table over the sending/receiving antenna, the return signal from that card would continue transmitting, and would be received by the transceiver for a number of seconds or more, or as long as the card remains at that position on the table. Thus, the system can distinguish between a card dealt to a player and a card dealt to the dealer, and it is therefore able to display the hands dealt to the players and to the dealer on a monitor screen.

In FIG. 3, it is contemplated that detection zones 40 and chip area 38 may incorporate only a single antenna with a detection zone indicated by the broken lines forming rectangle 36. This single antenna system can determine the order of cards being dealt from a hand dealt deck, and apply that order of dealt cards to the appropriate participant, and thus display each participant's hand on a monitor screen. An indicator representing the favorability of the remaining composition of cards in the deck or another betting calculation can also be displayed on the monitor screen.

In games such as Blackjack where the order of cards after the initial deal is not constant, additional information must be supplied to the system in order for the computer to determine when one player has finished taking additional cards and another player has begun taking additional cards. This can be accomplished by placing additional RF antennas under each players betting area. When a player has finished taking additional cards, he would be required to place the cards held in his hand face down over the bet area, or with one corner of his cards tucked under his bet. The computer would register the cards placed within the betting area, and thus be able to determine when one player has finished taking cards and another has begun.

U.S. Pat. No. 5,735,742 and U.S. Pat. No. 5,651,548 describe the placement of RFID transponders in casino gaming chips, and the placement of RFID sending/receiving antenna under the player's bet area, and under the dealer's chip holding area. The purpose of this chip detection system is to be able to keep track of a player's bets, as well as determine the value of the betting chips contained within the dealer's chip holding area. The RFID card detection system of the present invention is well suited to be combined with the aforementioned RFID chip detection system in order to provide additional betting information to the casino's computer.

When using the single antenna, card reading system of the present invention, and a player splits or doubles-down in the game of Blackjack, the computer would not be able to register that action. However, when a player doubles his bet, that action would be registered by the computer when the additional chips are placed over the antenna located under the player's betting area. Therefore, the registering of additional game chips at a player's betting area would indicate to the computer that the player is doubling-down, or splitting his cards. A split may be differentiated from a double-down by removing one of the split bets from the player's bet detection area by sliding the bet to one side while cards are being added to the first hand, and then replacing the bet when cards are being added to the second hand. A double-down bet would only receive one additional card in all cases. Therefore, if a doubled bet is not separated by the dealer, the computer will recognize the bet as a double-down, and not a split, and thus only one card would be applied to the player's hand, and the computer would be able to determine that the next card dealt will be applied to the following player. Thus, card activity can be ascertained by the computer in most instances, and replicated on a monitor screen.

The single antenna, card reading system of the present invention is also well suited to combine functions with the Insurance/Blackjack checking and notification system as described herein, as both systems require a single sending/receiving antenna located under or in the table, in front of the dealer.

It is one intended purpose of detection zones 8, 10 and 12 to provide the casino establishment a visual indication of the favorable/unfavorable betting indicator on monitor screen 26. This favorable/unfavorable betting indicator is simply a communication to casino table security of the ratio of favorable cards for the player, such as tens and aces, to the unfavorable cards for the player, such as the 3's, 4's, 5's, 6's, etc., that are remaining in a deck at a particular Blackjack table 4. It is the purpose of the present invention to provide the casino establishment an indicator of the favorable cards to the unfavorable cards in the remaining un-dealt deck or decks at each Blackjack table 4 in the casino, thereby allowing the casino to identify advantaged players when unusually large bets are placed at a card table during certain advantageous situations.

By themselves, shoe detection zone 10 and dealer detection zone 12 do not have the ability to accurately monitor an ongoing card game, since the system computer 20 cannot always determine to which player a card is being dealt. In order to make this determination and enable the system 2 to monitor and display card activity on monitor screen 26, antenna systems 10 and 12 must be combined with antenna system 8. Antenna array 8 has an antenna positioned under or inside the RF gaming table 4 corresponding to each player position at the gaming table 4 and has the ability to inform the system computer 20 which player is receiving the dealt card.

In FIG. 1, seven player antenna detection zones 8 are shown representing seven players seated at gaming table 4. It is contemplated that any number of antennas may be used for an equivalent number of players. The player antennas 8 are positioned so as to be able to detect the cards as they are dealt across the player antennas 8 on their way to player's card receiving area 14. This antenna array 8 is meant to aid and work in tandem with antenna systems 10 and 12, but cannot work by itself, since it is a requirement of the RF table system 2 to also be able to detect the dealer's hand. This can be accomplished by incorporating the dealer's antenna system 12, which can detect the identity of cards when they are placed flat on the table 4 at that position.

The player antennas 8 are also positioned so as to be able to read the cards as they are placed face-up on the table 4 in front of each player when he/she is asking for a card. The player antennas 8 have been extended towards the dealer to an area within easy reach of the dealer so that the deck 6 that is held in the dealer's hand can be used as a signaling device to convey information to or facilitate an action from the system computer 20 or casino security or personnel regarding an individual player seated at the table or regarding an individual player's hand by the movement of the deck by the dealer into a player's antenna area 8. The player antennas 8 also have the ability to detect the player's two hand-held cards when the player places his two cards under his bet, signaling to the system computer 20 and the dealer that he does not require additional cards to form his hand or that he has finished asking for cards.

The system 2 can also recognize the player's signal or communication to the system 2 by the player's movement of his original two cards into an antenna detection zone located at the gaming table 4. For example, the player could ask the RF table system 2 for help on basic strategy or facilitate a drink order through the in-and-out movement of his/her cards over one antenna 8, or between two or more antennas on table 4. A digital display could be placed at each player position as a communication device between the system computer 20 and the player.

In order for the radio frequency gaming table to work as intended, computer software must be installed. In FIG. 1, the dotted lines and the five discs 24 represent the installation of this software into the casino's computer system 22. Since the casino computer 22 is hardwired to the system computer 20, the operational software can be transferred from the casino's computer 22 to the hard drive on system computer 20, thus keeping the system secure from casino employee tampering. However, it is contemplated that operational software may be installed directly in the system computer 20 in such applications as an insurance/blackjack-check device (discussed below), since it is an application when used alone does not require that the system computer 20 be connected to the casino computer 22.

Figure 4:
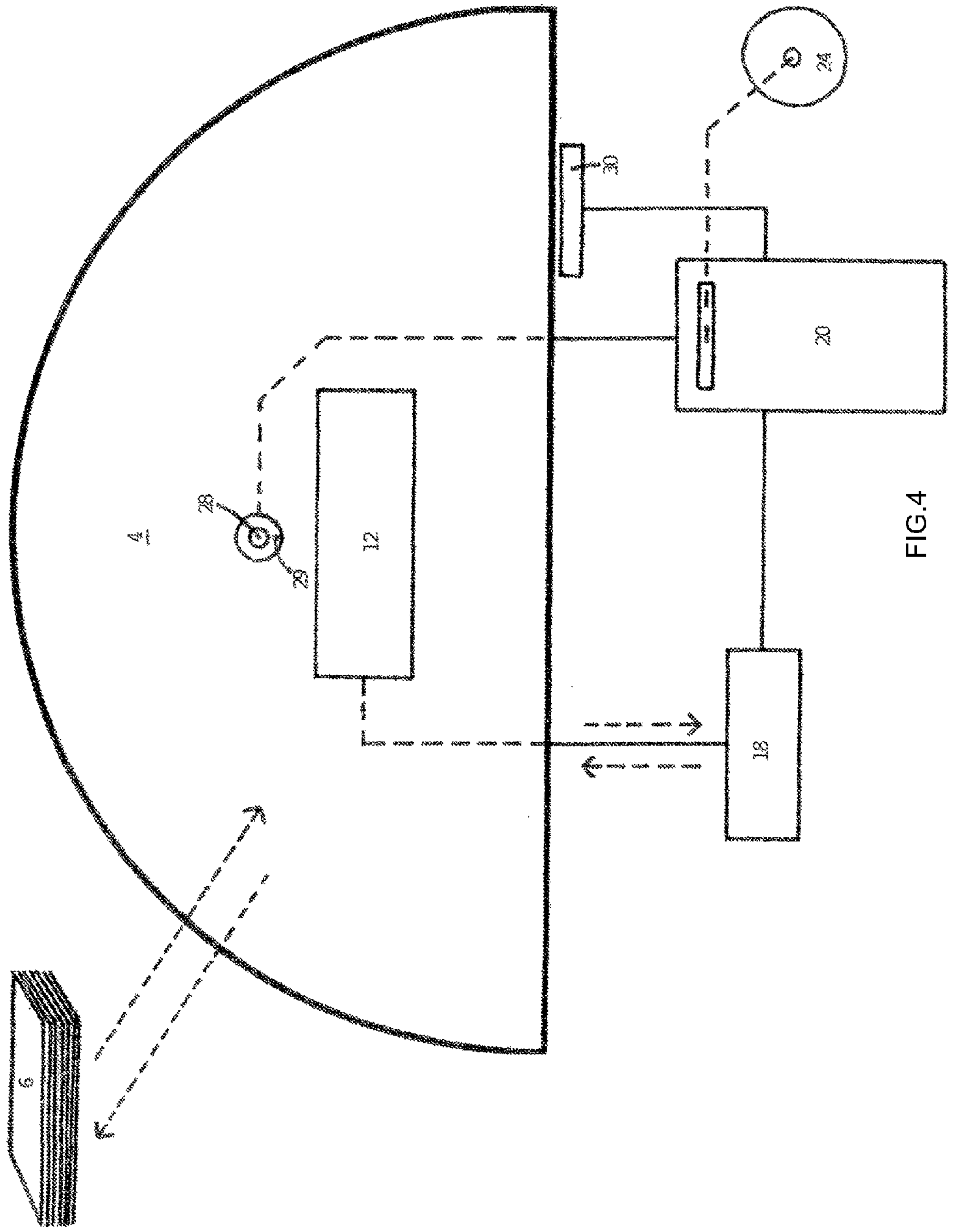
FIG. 4 illustrates yet another exemplary embodiment of a smart table system for RF playing cards in accordance with the present invention.

FIG. 4 represents the physical embodiment of the insurance/blackjack-check device when used solely by itself on an RF enabled blackjack table 4. This device consists of a deck 6 of playing cards, including the cut card, having a chipless RF tag imprinted on the surface of each card, an RF enabled Blackjack table 4, a sending/receiving antenna 12, an RF sending/receiving transceiver 18 connected to antenna 12, a system computer 20 connected to transceiver 18, a three-way indicator light 28 disposed on table 4 and connected to system computer 20, a dealer's digital display 30 connected to system computer 20, and operational software 24 installed on system computer 20.

The insurance/blackjack-check device uses three-way indicator light 28 to indicate to the players when the dealer's first card dealt is an ace-up. Light 28 is configured to provide three distinct types of illuminations: (1) a red light signaling that the dealer has blackjack, (2) a green light signaling that the dealer does not have blackjack, and (3) a third cautionary light, preferably of yellow color or of a color from the yellow to orange light spectrum, signaling that the dealer's face-up card is an Ace. The third cautionary light communicates to the players that they may make the insurance bet. After the players have placed their insurance bet, or indicated to the dealer that they do not want to make an insurance bet, the dealer uses deck 6 in his hand as a remote control signaling device to signal to the system computer 20 to reveal the red or green blackjack light to the players. When the dealer lowers the deck 6 to the table 4 within the antenna's detection zone 12, either a red or green light will illuminate within the three-way light 28, indicating as to whether or not the dealer has a blackjack.

The light 28 will also automatically illuminate in red when the dealer has a ten or face card up, and an ace face down, indicating to the dealer and to the players that the dealer has a blackjack. In this situation, the players do not have the opportunity to make the insurance bet according to the rules of Blackjack. The losing bets are taken by the dealer and the previously dealt cards are picked up by the dealer so that cards can then be dealt out for the next round.

The three-way indicator light 28 may also illuminate when the dealer busts. The intended purpose of this illumination by the three-way indicator light 28 is to inform the players and confirm to the dealer that the dealer's hand has exceeded a total value of 21.

The three-way indicator light 28 allows the game to move along more smoothly and expediently. It also makes the dealer's job easier by automatically informing the players that they may make the insurance bet or by saving the dealer the action of looking under his cards or the movement of the dealer's cards to an optical sensor to determine if the dealer has a blackjack.

The three-way indicator light 28 may also have a fourth light 29 (preferably white or blue) that only the dealer can see. This small LED light 29 may be placed in a small cylinder or tube-like structure incorporated within the three-way light housing 28 and aimed towards the dealer's head area. The purpose of this fourth light 28 is for the system computer 20 to communicate with the dealer. For example, when the dealer drops his hand to ask for the blackjack determination or when the dealer moves the deck 6 into a player's antenna detection zone 8 to communicate by the dealer to the system computer that a player is splitting, the fourth indicator light 29 might blink or flicker in order to indicate to the dealer that his action was registered by the system computer 20.

As mentioned above, system 2 is configured to determine when a player is splitting. In order for the system computer 20 to determine when the player is splitting, the dealer signals the system computer 20 by using the deck 6 as a remote control signaling device. One reason why this signal by the dealer is necessary is that when a player splits his cards, both cards will generally be placed over a single antenna. This antenna has the ability to detect both transponder imprinted cards, but lacks the ability to determine whether both cards have been placed as a single hand or if they have been separated into two hands. The signal by the dealer to indicate to the system computer 20 that a player is splitting his/her cards can be accomplished by moving the deck 6 in and out of the player's antenna detection zone 8. By moving the hand-held deck 6 into an individual player's card detection area 8, the dealer not only is able to communicate to the system computer 20 when a player is splitting his cards, but by the same movement into the detection zone 8, the dealer can communicate to the system computer 20 when a player has finished taking cards on his first hand and has begun taking cards on his second hand. For example, when a player receives two eights, he may play the cards together for an initial value of sixteen or split the two cards into two hands, with each hand having an initial value of eight. If the player receives a third card with a value of eight, he may play that card on the first hand, or he may again split the eights, resulting in three hands with a value of eight. In order for the dealer to signal to the system computer 20 that a player is splitting for a third time, he can move the hand holding the deck 6 from the normal dealing area above the chip tray area or the dealer's antenna area 12, to a position over a player's antenna detection zone 8. If the dealer was already holding the deck from an area within the player's detection zone 8, he would first have to remove the deck from the detection zone 8 and then place the deck back into the player's detection zone 8. If the player receives a fourth card with a value of eight, the same in-and-out method could be used by the dealer to communicate to the system computer 20 that the player has split for a fourth time.

The next card dealt to the player will generally be played on the player's first hand, since the rules of Blackjack at most establishments dictate that a player may only split four times in one round. After one or more cards are dealt to the player's first hand, the player may signal to the dealer that the next card dealt will be played on the second hand. In order for the dealer to signal to the system computer 20 that the next card dealt will be placed on the second hand, he can either move the deck 6 within the player's detection zone 8, or if the deck 6 is already in that detection zone 8, he can move the deck 6 out of and back into the player's detection zone 8. This movement of the deck 6 by the dealer allows the system computer 20 to determine when play on one hand has ended and play on the next hand has begun. This method may continue to be used until all four hands have been played.

Each CD-ROM 24 represents an individual software application that can be used by itself in a casino environment using a single antenna, or in tandem with another antenna system. Alternatively, all of the antenna systems in the radio frequency gaming table can be used together for optimum functionality.

Each software disc 24 not only represents an individual function of the radio frequency table system 2, but also a software principle governing the operation of the system 2, including the systems monitor screen 26, the three-way indicator light 28, and the dealer's digital display 30.

One concept represented by discs 24 is the concept of using the deck that the dealer is holding as a remote control switching device. For example, when the dealer drops the deck 6 to activate the insurance/blackjack three-way indicator light 28 to indicate whether or not the dealer has a blackjack or two-card 21 combination, the deck 6 is being used as a remote control to activate the switch that controls the light.

Generally, the dealer deals the deck from a position of about twelve inches or more above the gaming table 4 or out of range of the RF detection system 12. To activate the switch and call for the red/green light, the dealer may drop his hand, moving the deck 6 within range of the RF detection system 12. A switch may also be activated when the dealer places the deck 6 within reading range of a player's antenna 8, or another antenna located at the gaming table 4.

In order for the proposed system to function as intended, the system computer 20 must be programmed to identify the deck 6 in the dealer's hand from individually dealt cards.

This may be accomplished through a number of methods. The system computer 20 may be programmed to be able to distinguish between an individual card dealt from the two cards that the player is holding and from the deck 6 that the dealer is holding, which will always consist of two or more cards. In most instances, the deck 6 will include the cut card, which will also have a chipless RF tag imprinted upon one of its surfaces. The system 2 will be able to determine the presence of the deck 6 in the dealer's hand either by detecting the simultaneous presence of two or more cards over an antenna detection area (in situations where a casino does not use a cut card) or by an RF transponder imprinted on the cut card itself.

By imprinting an RF transponder on the cut card, the RF table system 2 will always be able to determine the deck 6 that is being held in the dealer's hand during an ongoing casino card game, thereby allowing the dealer to use the deck 6 that he or she is holding as a remote control switch, or activation device, activating and/or deactivating a table function or communication to the system computer 20 or casino personnel.

When dealing from a hand-held deck having a cut card, the cut card will remain with the deck during the course of the game, only to be removed from the deck when the deck is being shuffled. At that time, the cut card may be placed on different designated areas of the gaming table 4.

It is also the purpose of this invention that the deck or decks in the dealer's hand can also be used to make these communications by the dropping hand motion or the in-and-out motion when the deck is moved to a position over a detection zone at the gaming table 4.

A verification antenna area (not shown) can be used in tandem with the request antennas. First, the deck would be moved within a detection zone, at a specifically located antenna on gaming table 4. Second, in order to verify that the movement of the deck into a detection zone was intentional, the deck may be moved to an independent verification antenna position (not shown), thereby verifying and initializing the request by the dealer to the system or casino personnel.

A third alternative for activating a switching mechanism in system 2 is for the dealer to wear an RF transponder embedded ring, bracelet, or other wearable object on his hand or forearm. The switching mechanism could be activated by the movement of this transponder into a detection zone or by the dropping hand motion.

A fourth alternative to remotely activate the insurance/blackjack call light or other remote control switch on gaming table 2 would be for the dealer to wear an RF embedded nail laminate, sticker, or other attachable object to the nails, hand or forearm.

Figure 5:
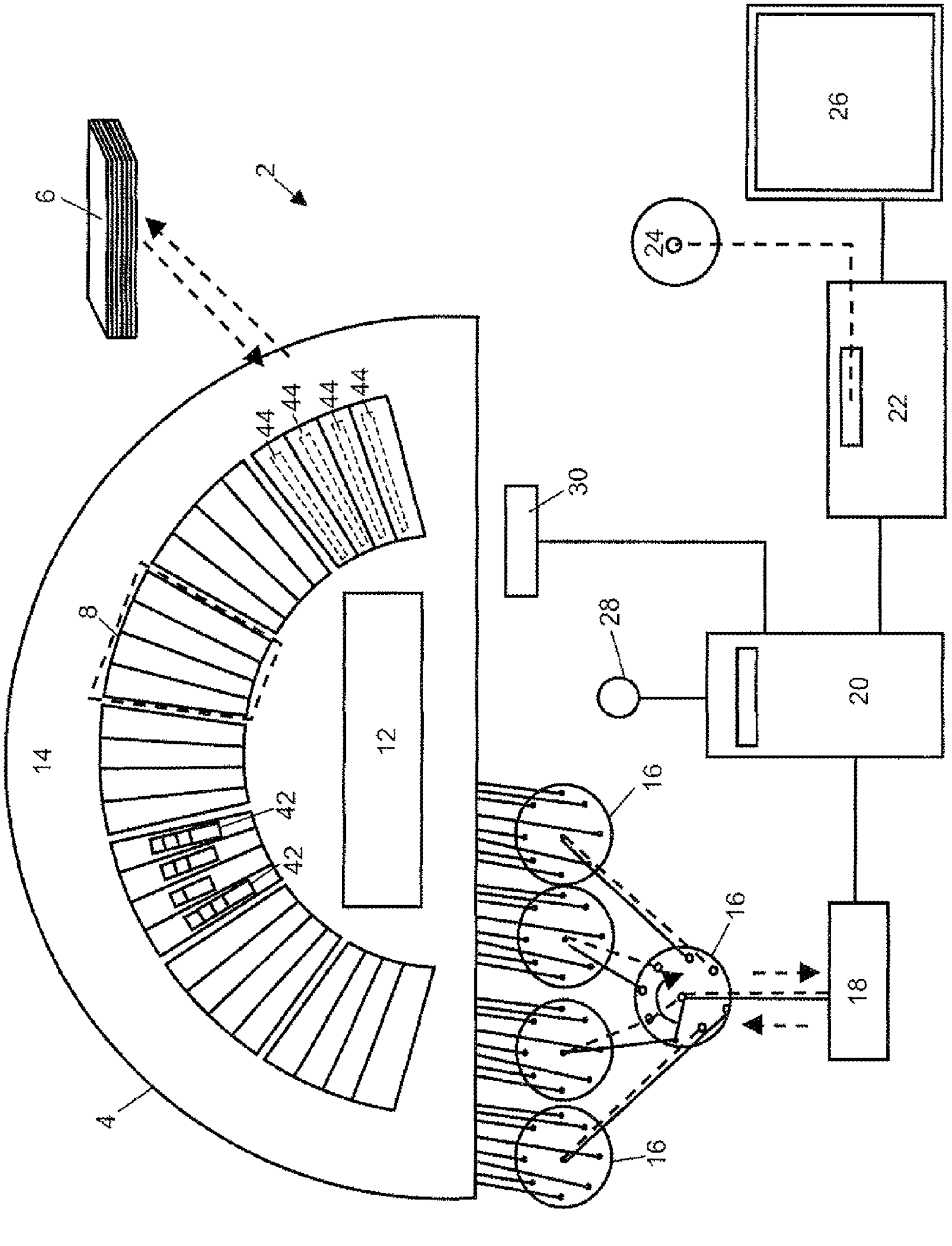
FIG. 5 illustrates an exemplary embodiment of a smart table system having a four antenna configuration in accordance with the present invention.

Player antennas 8 may comprise four separate antennas 44 placed parallel to each other at each player position 8. In FIG. 5, each antenna 44 located under or in the gaming table 4 is connected separately to the transceiver 18 via a plurality of multiplexers 16.

The transceiver 18 is connected to the system computer 20, which may register all of the unique return response signals emanating from the cards at ¼ of a second intervals. The system computer 20 then relays card location information to the casino computer 22 at ¼ of a second intervals, thereby allowing card movement activity to be registered and recorded with the casino computer 22 and displayed in picture form on a monitor screen 26.

FIG. 1 shows that the player's card detection areas 8 have not been positioned at a location on gaming table 4 where cards would normally land during the initial deal to the players, such as card receiving area 14, as has been proposed in the previous gaming tables. Rather, the player antennas 44 have been designed to be clear of card receiving area 14, so that when a player is holding his/her cards over the table 4 as is required in the game of Blackjack, the player's original two cards will not be within card detection zone 8.

Additionally, when the player has finished asking for additional cards to make his hand, or if he does not require additional cards, he will usually place his cards flat on the table, face down by the betting area or with one corner of the cards tucked under his bet. This action by the player signifies to the dealer that he does not require additional cards and is dictated by the rules of Blackjack.

Player antennas 44 may be used as an antenna array that has the ability to detect the transponders on playing cards as they are dealt across the antenna's card detection zone 44 from a hand-held deck by the dealer. This antenna system can determine the difference between cards being dealt and cards placed flat on the table over the player's antennas 44 by the length of time that a card is detected at a particular detection zone 44. For instance, a dealt card would register with system computer 20 for less than about ¼ of a second. However, a card laid flat on the table 4 would register with the system computer 20 as long as the card remains at that location. Therefore, the action by a player of placing his two original cards under his bet can signal to the system computer 20 that a player has finished taking cards.

Alternatively, using the antenna array as a reference, when the next card is placed at another antenna position 44, the system computer 20 is able to determine that one player has finished taking cards and another player has begun taking cards. However, when no other players, nor the dealer, draw additional cards, the player's two cards that are tucked under his bet can act as an indicator to the system computer 20 that a player has finished taking cards. A player's total hand count value can then be displayed on monitor screen 26.

Therefore, blackjack gaming table 4 has been intentionally designed with a card receiving area 14 that does not contain an antenna where the player hold his cards so that the player's cards, located out of a detection zone, can be placed into a detection zone, and thus engage a switch activating or deactivating a system function.

FIG. 5 illustrates an antenna layout where each player's card detection zone 8 may incorporate four separate antennas 44 placed substantially parallel to each other. With this antenna configuration, a player's cards can be detected when a player splits his hand into two hands. Furthermore, if a player decides to split his original two cards plus two additionally dealt cards into three or four separate hands such as four 5's, this multiple antenna configuration is able to detect this action.

Additionally, since in the game of Blackjack, split hands 42 are positioned in rows as seen in FIG. 5, the 4-way multiple antenna system will be able to determine which cards are played on each of the four hands. The four card detection zones at each player position 8 may work separately detecting a player's hands during a split situation, or they may work together as a single detection zone at a player position as previously described for FIG. 1.

When placing RF sending/receiving antennas 44 in close proximity to each other, such as in FIG. 5, one antenna's read range cannot extend substantially into another's read range. Therefore, when antennas are placed in a close configuration, each antenna's read range must be confined to a distance of about two inches or less, horizontally and vertically. The desired effect can be achieved by placing several looped antennas under or in the gaming table in a parallel fashion as shown and lowering the voltage to those antennas to a point where one antenna's read range does not overlap another's read range substantially.

When using an RF system operating at the 13.56 mHz frequency, an antenna's read range can be as much as fourteen inches. Therefore, this two-inch reach confinement of each antenna's detection zone at a player position can be achieved by either lowering the voltage of the powering signal emanating from the transceiver 18 or by using a system operating at a different frequency such as 125 kHz, which has a lower read range of up to about an inch to two inches from each side of the antenna 44, as shown in FIG. 5.

Two read ranges can be achieved at a particular antenna location by multiplexing two separate voltages through the system, when transmitting at the 13.56 mHz frequency, or by multiplexing two separate frequencies through the system. In the latter case, two separate transponders may have to be imprinted on each card in order for the transponders to correspond to a transceiver or transceivers transmitting at two separate frequencies.

Two separate transponders could be imprinted on the same side of a playing card or they could be imprinted on both sides of the card. Both transponders imprinted on the same side of a playing card could be connected to either the same antenna or separate antennas.

When using different frequencies at a specific table location, it is contemplated that a separate table antenna may be used for each frequency.

The antenna array shown in FIG. 5 indicates twenty-eight separate detection zones, or four detection zones for each player in a seven player game. However, it is contemplated that this twenty-eight detection zone antenna array will work just as well at a table designed for five or six players. This solid antenna array spans the gaming table, and is able to detect cards placed upon a specific detection zone, and detect cards dealt across a specific detection zone. The detection zones may overlap slightly so that when a card is placed between the two detection zones, the card will be detected by one or both zones.

When the dealer opens up a new deck and spreads the cards across the table in order to make a visual inspection, the system can immediately determine if there are any missing cards or any extra cards in the deck. The system can then notify the dealer or other appropriate casino personnel if appropriate.

Figure 6A:
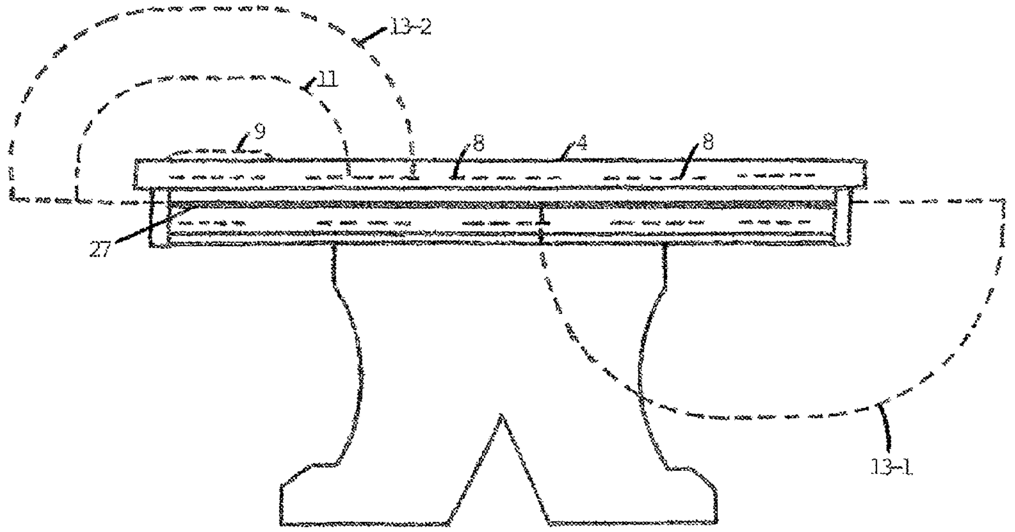
FIG. 6A illustrates a cross-sectional side view of an exemplary embodiment of a smart table system for RF playing cards in accordance with the present invention.
Figure 6B:
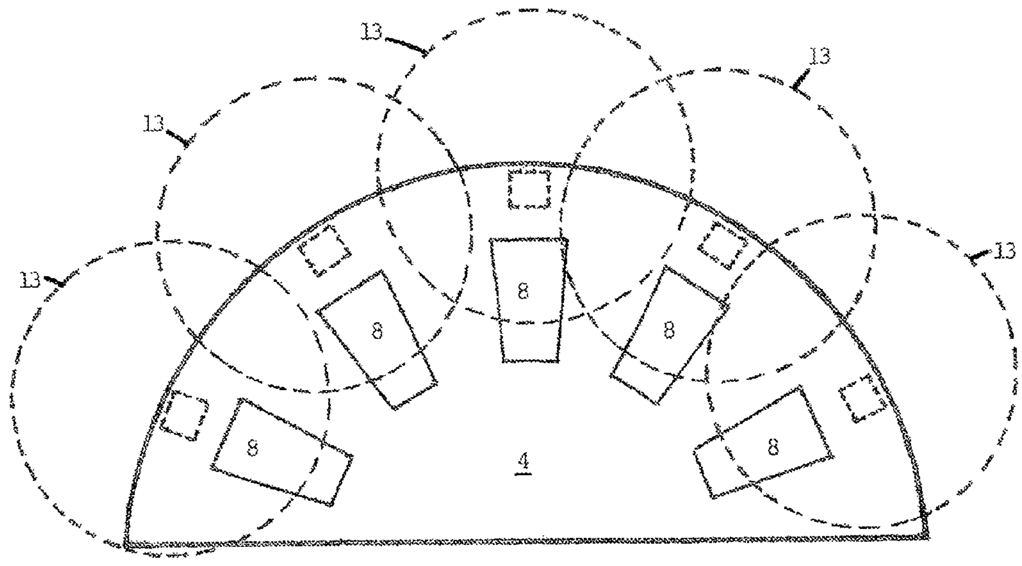
FIG. 6B illustrates a plan view of the smart table system of FIG. 6A in accordance with the present invention.

By multiplexing two separate frequencies or voltages through the system, cards can be identified as they are dealt across the table at a height above the table of up to fourteen inches, and at the same time, the system can determine the presence of a card laid flat on the table at an antenna location in close proximity to other antennas. FIGS. 6A and 6B illustrate an exemplary embodiment of the system's use of multiple frequencies for different purposes. In FIGS. 6A and 6B, table 4 comprises five player detection zones 8. Each player detection zone 8 is configured to receive and transmit signals from transceiver 18 at three different frequencies. The first frequency is configured to reach cards laid flat on table 4. This first frequency results in a detection zone 9 that extends only a short distance from table 4. The second frequency is configured to reach cards dealt across table 4. This second frequency results in a detection zone 11 that extends only a medium distance from table 4, such as up to about fourteen inches. The third frequency is configured to reach cards that are removed from table 4. This third frequency results in a detection zone 13-1 that extends a larger distance from table 4, thereby notifying the system computer 20 if a player has removed a card from the table 4. Therefore, if a player removes a card from the table in violation of standard casino rules, the system computer will pick up this violation and notify the dealer or other casino personnel. Notification may be provided immediately. Alternatively, a predetermined amount of time may be provided before notification in order to give the player who removed the card a grace period within which to place the card back on the table, such as when a card is accidentally knocked off of the table. The third frequency may also be applied to the top of the table, resulting in detection zone 13-2, which may detect a card that is on the table even if the card is outside the range of a player's antenna. Detection zone 13-2 also may cover a distance off of the table in case a player simply picks up the cards just to look at them. An RF barrier 27 may be disposed in the table to separate detection zones 9, 11, and 13-2 from extending below the table and detection zone 13-1 from extending above the table. The organization and activation of these detection zones may be controlled by the multiplexer. In a preferred embodiment, the first frequency is about 125 kHz, the second frequency is about 13.56 mHz and the third frequency is about 900 mHz. However, it is contemplated that other frequencies may be used as well.

In FIG. 6B, five player positions are shown, with five corresponding antennas located above and below the table. The illustration shows five detection zones 13 under the table represented by the five circles. The four areas around the table where two circles overlap, or where a transponder is detected by two separate detection zones, can be determined by the computer as four additional detection zones. Thus, the illustration actually shows nine detection zones.

By applying different voltages to the out going signal, or by applying different frequencies to the antennas located in the gaming table, a vast number of detection zones can be achieved horizontally, vertically, and multi-directionally. Therefore, by comparing overlapping detection zones, the computer can show on a monitor screen, by illustration, not only cards placed flat on the table over a detection zone, but cards held in three dimensional space by the participants, above and below the gaming table. Thus, the system can display a three dimensional illustration of all cards detected, in real time, and provide a record of game table and card activity.

Figure 7C:
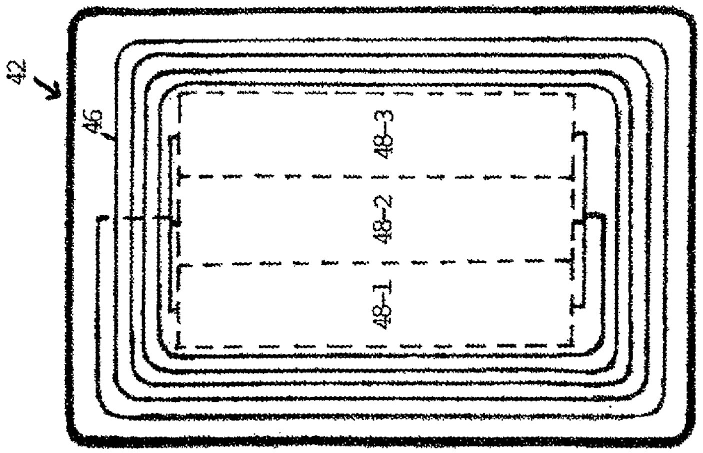
FIGS. 7 A-C illustrate exemplary embodiments of RF imprinted playing cards showing transponder positions in accordance with the present invention.
Figure 7B:
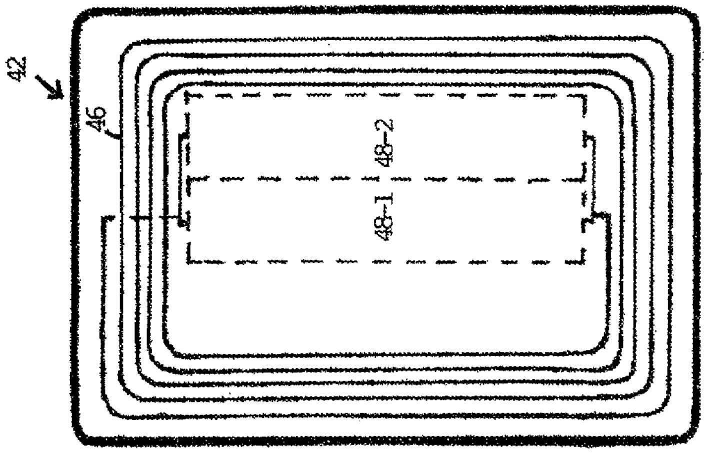
Figure 7A:
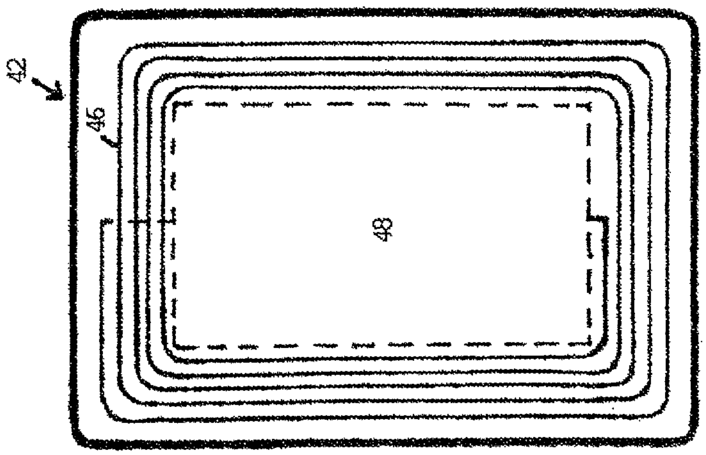

FIG. 7 A illustrates an exemplary embodiment of an RF imprinted playing card 42 in accordance with the present invention. Each card 42 in the deck 6 comprises its own RF imprinted transponder 48 capable of transmitting its own unique identifying signal in response to a particular modulated RF energizing signal from an antenna on table 4. In a preferred embodiment, the transponder 48 is disposed near the center of each card 42. However, it is contemplated that the transponder 48 may be placed in a variety of different locations on the card.

Each card 42 also comprises antenna 46 connected to the transponder 48 for receiving RF signals from the table antenna, relaying the RF signals to the transponder 48, and transmitting the responding unique identifying signal from the transponder 48 back to the table antenna. In a preferred embodiment, antenna 46 is disposed along the perimeter of the card 42. Furthermore, antenna 46 preferably loops around the perimeter of the card 42 between three and nine times. However, it is contemplated that a variety of different antenna designs may be employed.

Multiple transponders may be used in order to accommodate multiple frequencies. FIG. 7B illustrates card 42 comprising two transponders 48-1 and 48-2 in order to accommodate two different frequencies. FIG. 7C illustrates card 42 comprising three transponders 48-1, 48-2 and 48-3 in order to accommodate three different frequencies.

Figure 8C:
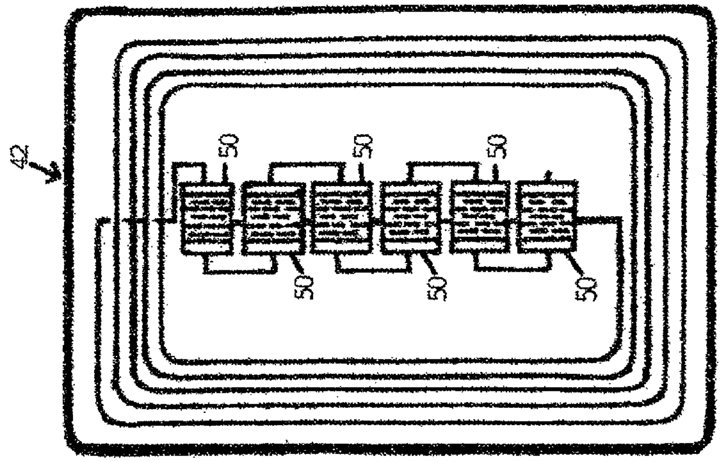
FIG. 8A-C illustrate exemplary embodiments of RF imprinted playing cards showing photodiode positions in accordance with the present invention.
Figure 8B:
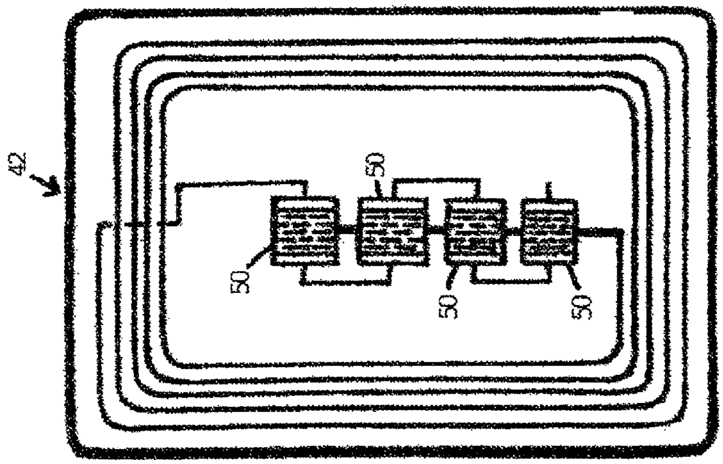
Figure 8A:
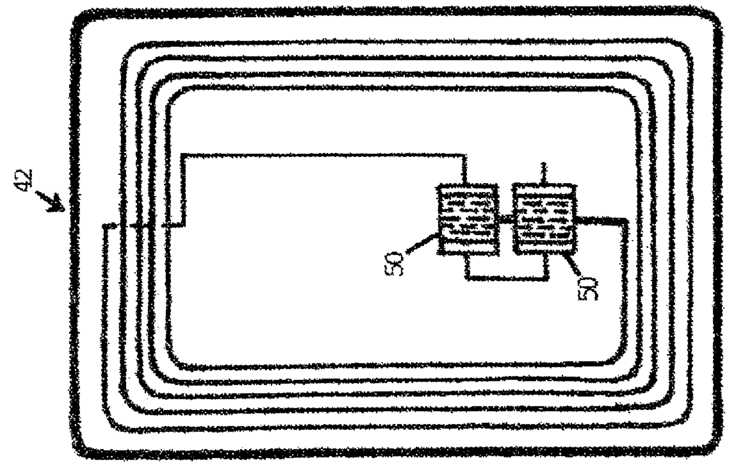

FIGS. 8A-C illustrate cards 42 comprising light emitting dye/photodiodes for transponders. FIG. 8A shows two light emitting dye/photodiode positions 50 on playing card 42. Three types of light emitting dye can be used in the printing process in order to emit three different intensities of light. After the conductive path layer and the light emitting layer are imprinted on the card substrate, a clear plastic coating may be applied. A photodiode 50 can then be applied over the light emitting dye layer and clear coating layer, and can therefore detect and transmit a return signal at three different intensities. Since each light emitting dye/photo diode position 50 can respond to a modulated RF signal in three different ways, placing a second photodiode position 50 on the cards would allow 9 different unique return responses to be transmitted by the cards (3×3=9). A third dye/diode position 50 would allow the cards to transmit 27 different response signals (9×3=27). By adding a fourth dye/diode position 50 on the cards as seen in FIG. 8B, 81 unique response signals can be achieved (27×3=81), which is more than enough to identify a single deck of 52 cards. In order to identify all 416 cards in an eight deck Blackjack shoe, 416 unique response transponders will be needed. By applying six dye/diode positions 50 on a card as seen in FIG. 8C, 729 unique response signals can be achieved, or three to the sixth power.

Figure 9:
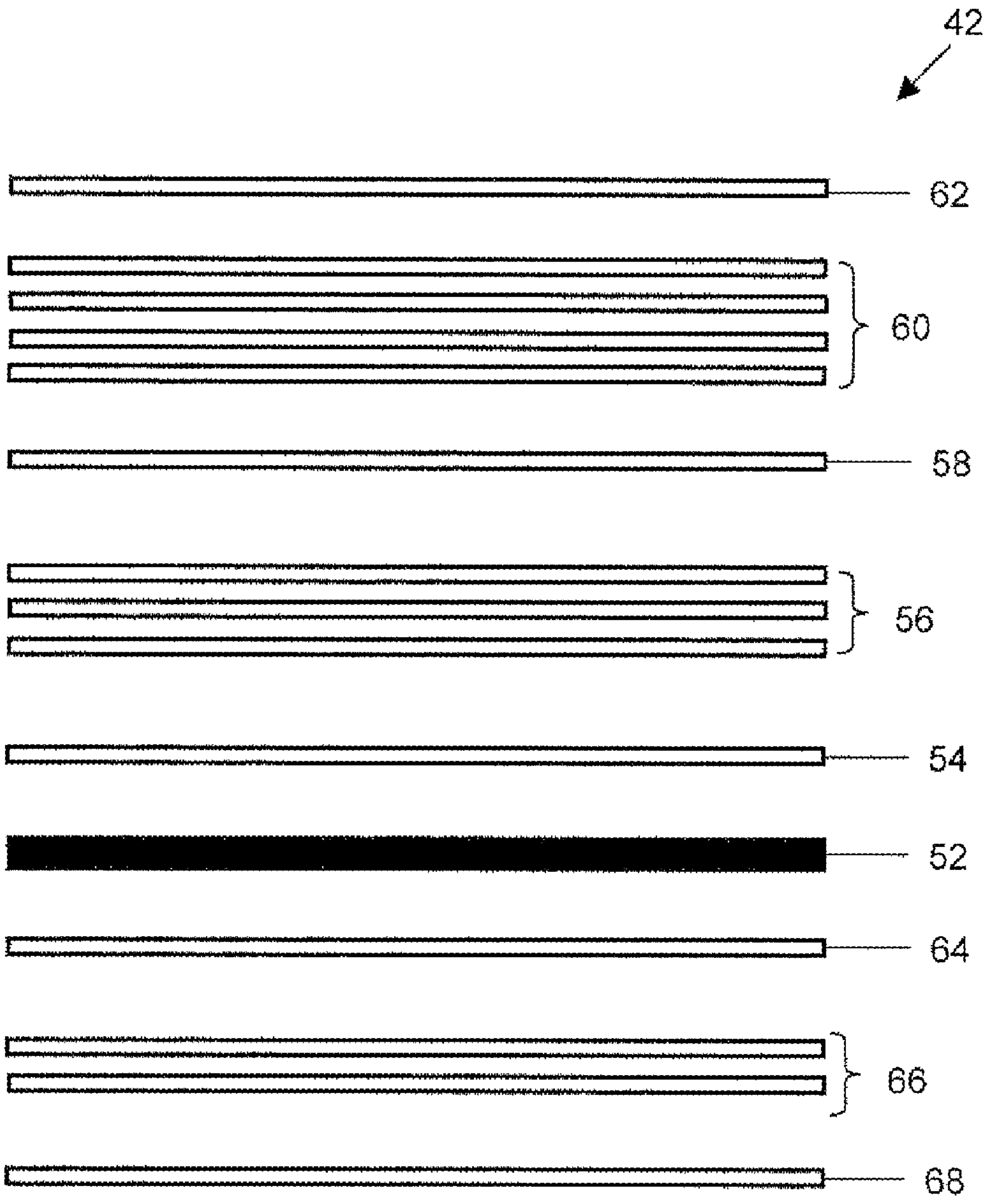
FIG. 9 illustrates an exemplary embodiment of the different layers in an RF imprinted playing card in accordance with the present invention.

FIG. 9 is an exploded side view an exemplary embodiment of the different layers in an RF imprinted playing card 42 in accordance with the present invention. Each card 42 has a substrate 52. In a preferred embodiment, substrate 52 comprises organic acetate or PVC vinyl card stock. However, it is contemplated that substrate 52 may comprise a variety of different materials. In a preferred embodiment, each card comprises only one substrate. If substrate 52 is a paper substrate, a protective coating (not shown), such as a plastic protective coating, may be disposed directly above and below substrate 52 for protection.

On the face side of substrate 52, antenna layer 54 may be disposed over substrate 52. However, it is contemplated that antenna layer 54 may be disposed anywhere above or below substrate 52. The imprinted antenna may consist of three layers: two imprinted antenna layers and an insulating layer between the two imprinted antenna layers. Imprinted transponder, or RF tag, 56 may be disposed over antenna layer 54. Imprinted transponder 56 preferably comprises at least three imprinted layers: which may include conductive, semi-conductive, dielectric and/or insulating layers. In one embodiment, a light-emitting layer may be used. Fill-in, organic film layer 58 may be disposed over imprinted transponder 56. Organic film layer 58 may consist of one or more layers and may be textured to resemble the look and feel of paper cards. Face indicia 60, such as rank, suit and other graphics, may be disposed over organic film layer 58. Face indicia layer 60 preferably comprises four or more layers of colors. Finally, a typical protective coating 62, preferably plastic, may be disposed over face indicia layer 60. It is noted that neither imprinted transponder 56 nor antenna layer 54 are laminated between two substrates.

On the back side of substrate 52, optional texture coating 64 may be disposed under substrate 52. Protective coating 64 may also be textured to resemble the look and feel of paper cards. Back indicia 66 may be disposed under texture coating 64. Back indicia 66 preferably comprises two or more layers of colors. Finally, a typical protective coating 68, preferably plastic, may be disposed under back indicia layer 66.

Although FIG. 9 shows each layer extending all the way across substrate 52, it is contemplated that the layers may be applied to specific, limited areas of the card.

Figure 10:
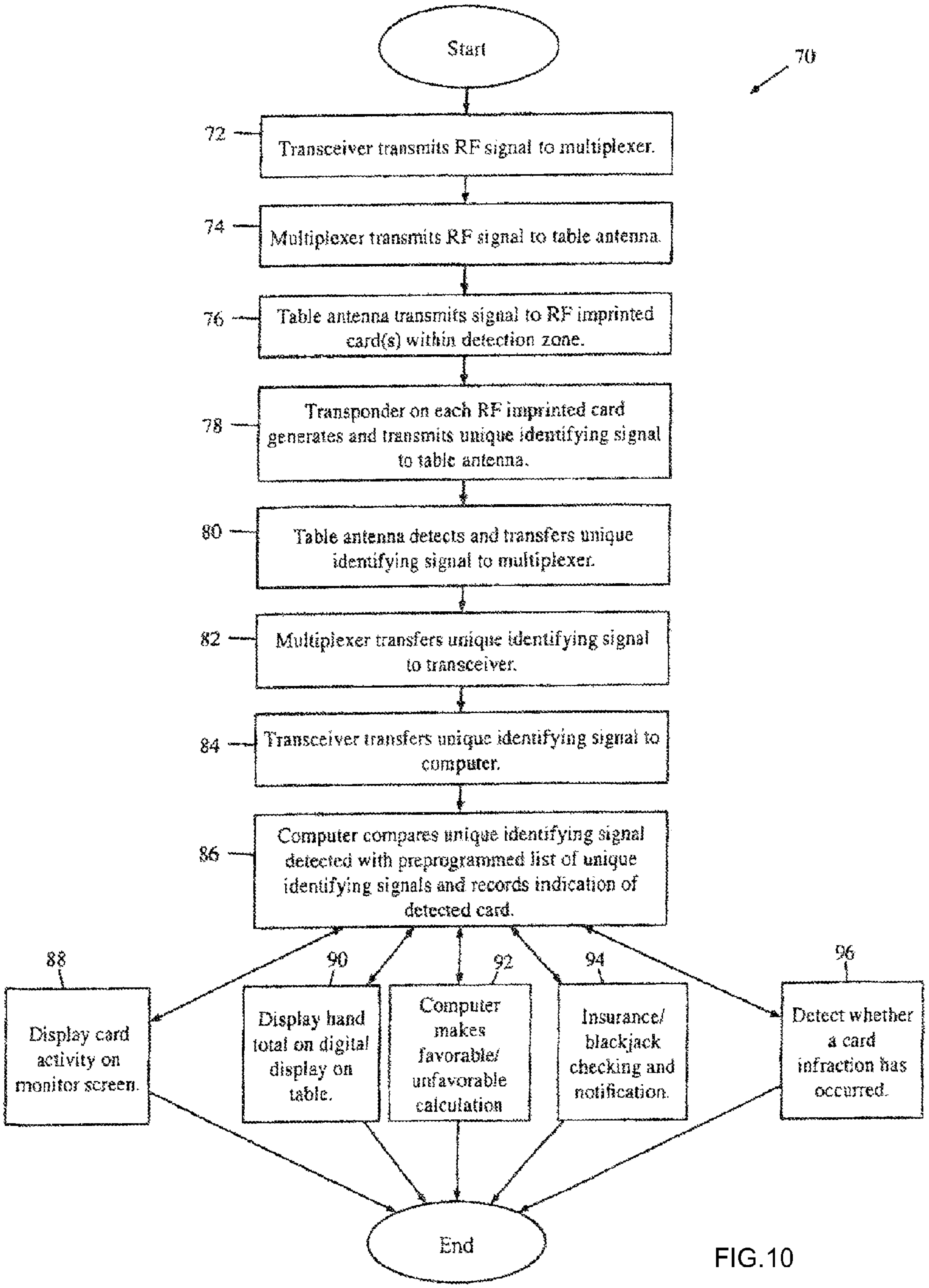
FIG. 10 is a flowchart illustrating an exemplary embodiment of the basic operation of the present invention.

FIG. 10 is a flowchart illustrating an exemplary embodiment of a method 70 of the present invention's basic operation. At step 72, the transceiver transmits an RF signal to the multiplexer. At step 74, the multiplexer transmits the RF signal to one of the sending/receiving antennas on the gaming table. At step 76, the table antenna transmits the RF signal to the RF imprinted card(s) that are within the detection zone of the table antenna. At step 78, the transponder on each RF imprinted card generates and transmits a unique identifying signal to the table antenna. At step 80, the table antenna detects and transfers the unique identifying signal to the multiplexer. At step 82, the multiplexer transfers the unique identifying signal to the transceiver. At step 84, the transceiver transfers the unique identifying signal to the system computer. At step 86, the system computer compares the unique identifying signal detected with a preprogrammed list of unique identifying signals and records the indication of the detected card.

The process then has several options. The completion of each option may either lead back to step 86 or result in the end of the process.

At step 88, the table's card activity may be displayed on a monitor screen connected to the system computer. The detected cards may be displayed on the monitor screen at their appropriate position. The cards at each position may be added up by the computer and the total may be displayed on the monitor screen. When a card is removed from the detection zone, the card is removed from the monitor screen.

At step 90, the hand total for a particular player position may be displayed on a digital display located on the table. In a preferred embodiment, the cards in the hand are totaled and displayed only after three cards have been detected at a particular location. When the cards are removed from the detection zone, the digital display goes out.

At step 92, a calculation can be made by the computer such as the favorable/unfavorable bet indicator. The calculation can be displayed on a monitor screen. Once the cut card is no longer in the deck, the calculation can be reset.

At step 94, the computer can apply the insurance/blackjack detection and notification process.

At step 96, the computer can detect and determine if a card has been removed from the gaming table, or if a card infraction has occurred. If a card has been removed from the table, or if card trading or card substitution has been detected by the system, the dealer or other casino personnel may be alerted. The notification to the dealer or other casino personnel me be delayed for a predetermined amount of time in order to allow for a card that has accidentally gone off the table to be put back within the card playing area.

It is contemplated that any of the operations of steps 88 through 96 may be performed separately or together in any combination. Furthermore, these operations may be repeated several times.

Figure 11:
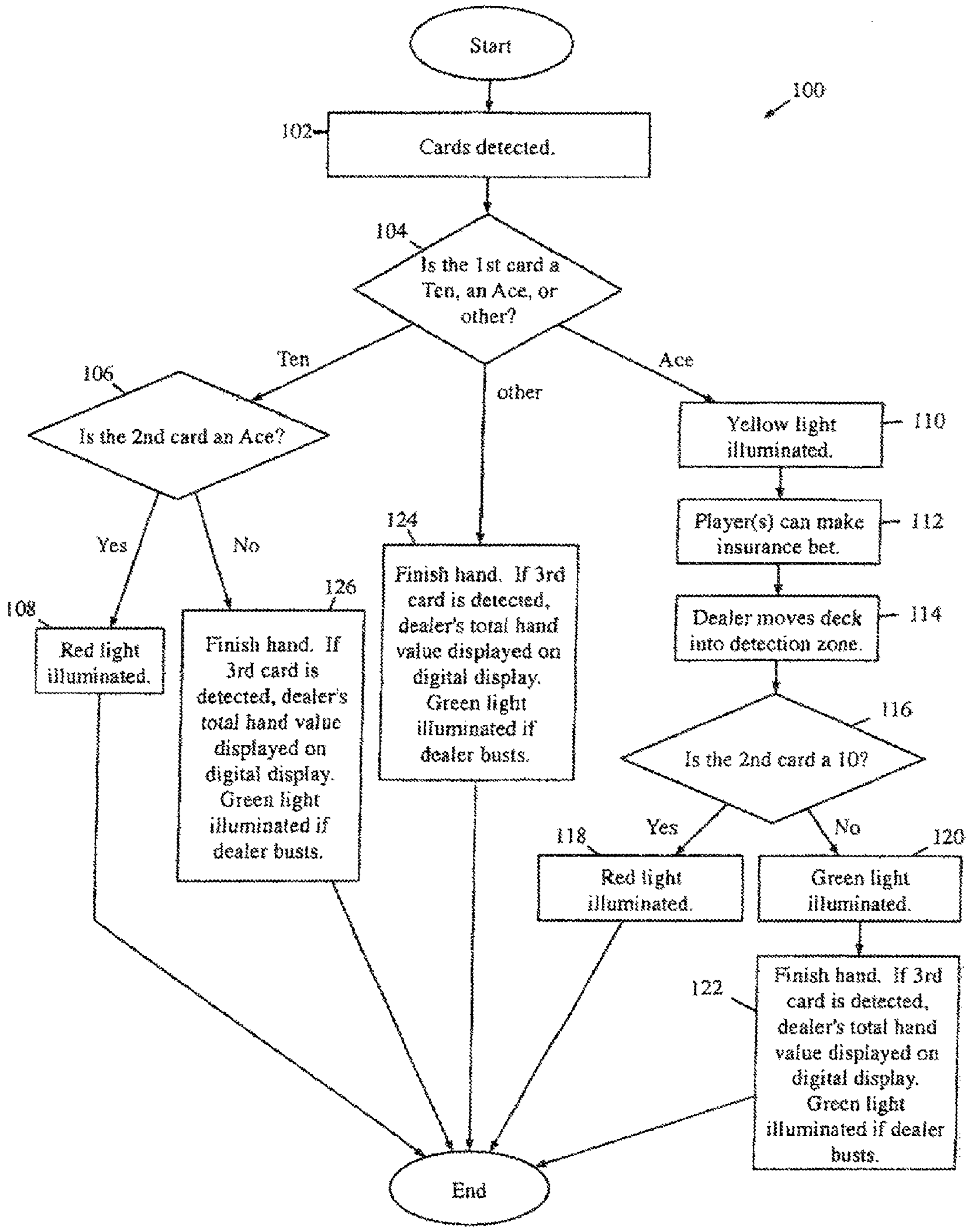
FIG. 11 is a flowchart illustrating an exemplary embodiment of an insurance/blackjack detection and notification method in accordance with the present invention.

FIG. 11 is a flow chart illustrating a more detailed embodiment of an insurance/blackjack detection and notification process 100 in accordance with the present invention. The RF imprinted cards are dealt to the players and the dealer, the dealer's cards being placed within the detection zone with the first card face-up and the second card face-down. As the cards are being dealt, the cards are detected by the system at step 102. It is then determined at step 104 whether the first card dealt to the dealer is a ten-value card, an Ace, or some other card. If the first card is neither a ten-value card or an Ace, the rest of the hand may then be played out at step 124 with the dealer's total hand value being displayed on the gaming table's digital display if a third card is detected within the detection zone. If the dealer's hand is a bust, then the green light is illuminated on the three-way indicator light. Once the dealer's cards are removed from the detection zone, the digital display may go out and the process may come to an end. If the first card is a ten-value card, it is determined at step 106 whether or not the second card is an Ace. If the second card is an Ace, the red light is illuminated on the three-way indicator light at step 108, after which the process may come to an end with the dealer having a blackjack. If the second card is not an Ace, then the rest of the hand may then be played out at step 126 with the dealer's total hand value being displayed on the gaming table's digital display if a third card is detected within the detection zone. If the dealer's hand is a bust, then the green light is illuminated on the three-way indicator light. Once the dealer's cards are removed from the detection zone, the digital display may go out and the process may come to an end. It is contemplated that in ending the process, each player's hand is played out as would normally be done in a typical game of Blackjack, with each player possibly taking additional cards depending on the dealer's hand.

At step 104, if the first card is an Ace, then the third cautionary light is illuminated on the three-way indicator light at step 110. The present invention uses the third cautionary light to convey to the player(s) that the dealer's face-up card is an Ace and that the insurance bet is an option to them. The players may then, at step 112, place a secondary bet as to whether or not the dealer has a blackjack. After the dealer has determined that each player has either placed an insurance bet or elected not to place an insurance bet, the dealer then moves the deck of RF imprinted cards within the detection zone at step 114, thereby signaling to the system to illuminate either the red or green indicator light. It is then determined at step 116 whether or not the dealer's second card is a ten-value card. If the second card is a ten-value card, then the red light is illuminated on the three-way indicator light at step 118, thereby notifying the player(s) that the dealer has blackjack. The red indicator light may go out after a predetermined amount of time, such as five seconds, or after the dealer's cards are removed from the detection zone. The process then comes to an end.

At step 116, if the second card is not a ten-value card, then the green light is illuminated on the three-way indicator light at step 120, thereby notifying the player(s) that the dealer does not have blackjack. The green indicator light may go out after a predetermined amount of time, such as five seconds. The rest of the hand may then be played out at step 122 with the dealer's total hand value being displayed on the gaming table's digital display if a third card is detected within the detection zone. If the dealer's hand is a bust, then the green light is illuminated on the three-way indicator light. Once the dealer's cards are removed from the detection zone, the digital display may go out and the process may come to an end.

The method of signaling to the system that it is proper to illuminate the red/green light is preferably by a dropping-hand motion towards the gaming table by the dealer of the hand holding the deck of RF imprinted cards, thereby bringing the deck within range of the detection zone of the RF sending/receiving antenna placed under the gaming table and in front of the dealer. In a preferred embodiment, the detection zone extends a number of inches above the gaming table.

Figure 12:
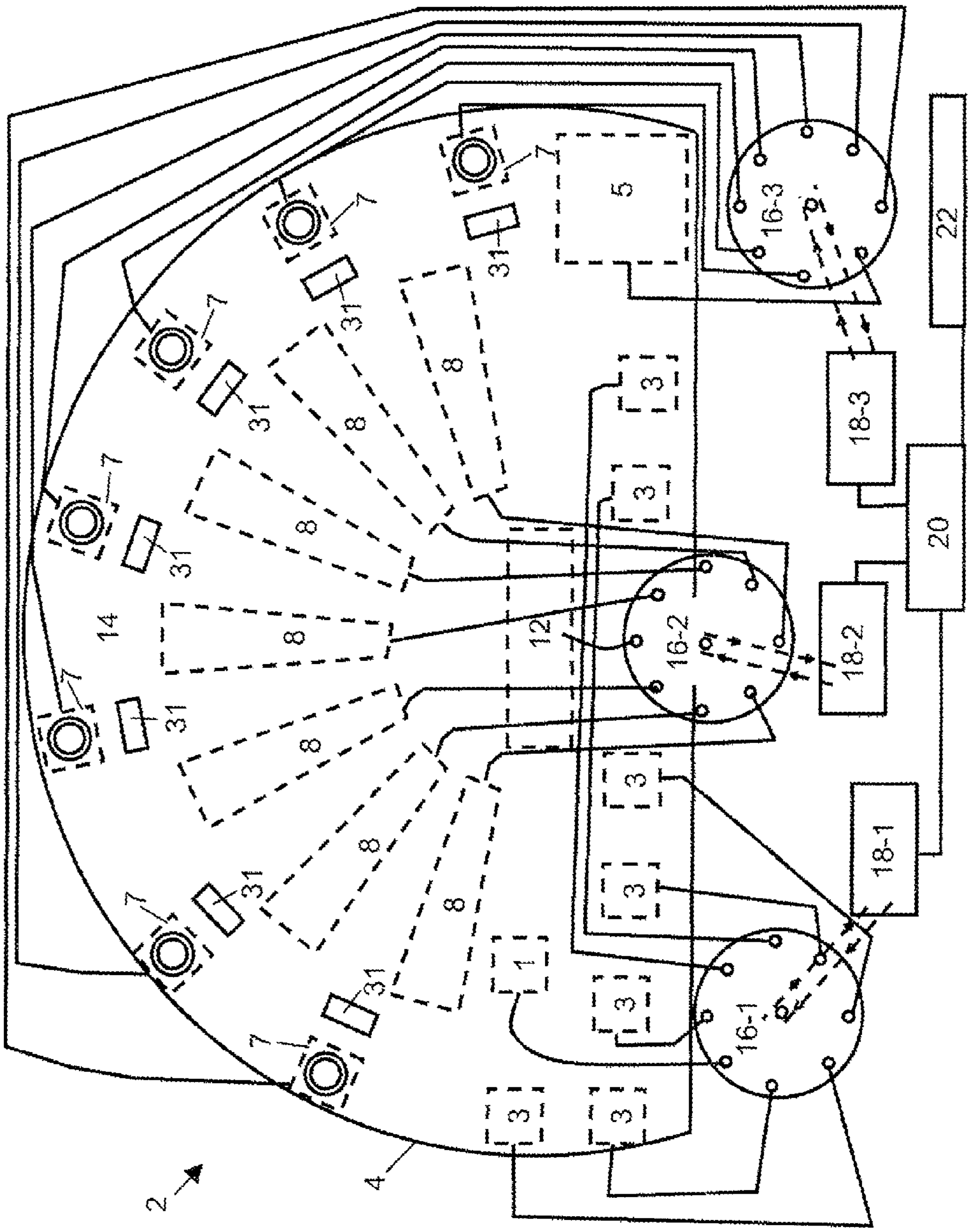
FIG. 12 illustrates another exemplary embodiment of an RF enabled smart table system showing multiplexer connections to different antennas having different functions in accordance with the present invention.

FIG. 12 illustrates another exemplary embodiment of an RF enabled smart table system 2 showing multiplexer connections to different antennas having different functions in accordance with the present invention. In FIG. 12, table 4 includes player request antennas 7 disposed next to each player position. Player request antennas 7 may be used for a variety of purposes. In one embodiment, a player may move his cards within the detection zone of request antenna 7 in order to send a signal to the computer that the player is requesting a cocktail waitress. The computer would then notify the proper casino personnel. In another embodiment, an RF antenna may be placed under digital display 31. The player could see his total hand value (or receive advice from the computer on how to play a hand) either by pressing a button on the display or by waiving his cards over the display. This action by the player would signal to the system that the player wants to see his total hand value. The computer would then calculate the player's hand value and display the score on a digital display 31 in front of the player. The player may then move his two cards once again within the detection zone to turn off the digital display Similarly, the dealer can also use the cards as a remote control to operate the functions of the table. The dealer can move the cards within detection zone 5 in order to call a waitress over to take drink orders. Additional dealer request antennas 3 may be provided, each configured to allow the dealer to activate a distinct table function. For example, antennas 3 may serve to request a new deck of cards, request more chips, call for a new dealer to relieve the current dealer, and request security. A verification antenna 1 may be provided in order to prevent the dealer from accidentally activating a request. For example, if the dealer wants to call casino security over to the table, the dealer could first move the deck of cards within the detection zone of antenna 3, signifying a security request, then within the detection zone of antenna 1, verifying the request. The computer would not process the request unless the cards were moved within the detection zone of the verification antenna.

FIG. 12 also shows table 4 employing multiple transceivers and multiplexers. Transceiver 18-1, 18-2, and 18-3 are all connected to system computer 20 and connected to multiplexers 16-1, 16-2, and 16-3 respectively. Transceiver 18-1 and multiplexer 16-1 may be connected to the dealer request antennas 3 and the verification antenna 1. Transceiver 18-2 and multiplexer 16-2 may be connected to dealer antenna 12 and player antennas 8. Transceiver 18-3 and multiplexer 16-3 may be connected to the dealer drink order antenna 5 and the player request antennas 7. In this fashion, each transceiver and multiplexer grouping may operate in conjunction with its respective antennas.

A fourth multiplexer system (not shown) may be added in order to accommodate a plurality of RF antennas located under each player's digital display.

FIG. 12 shows three separate multiplexers relaying RF signals to and from twenty-four positions on the table. It is contemplated that a single multiplexer could relay RF signals to all twenty-four antenna positions, or that a special transceiver with multiplexing capabilities could be used to relay RF signals to all twenty-four positions.

Figure 13A:
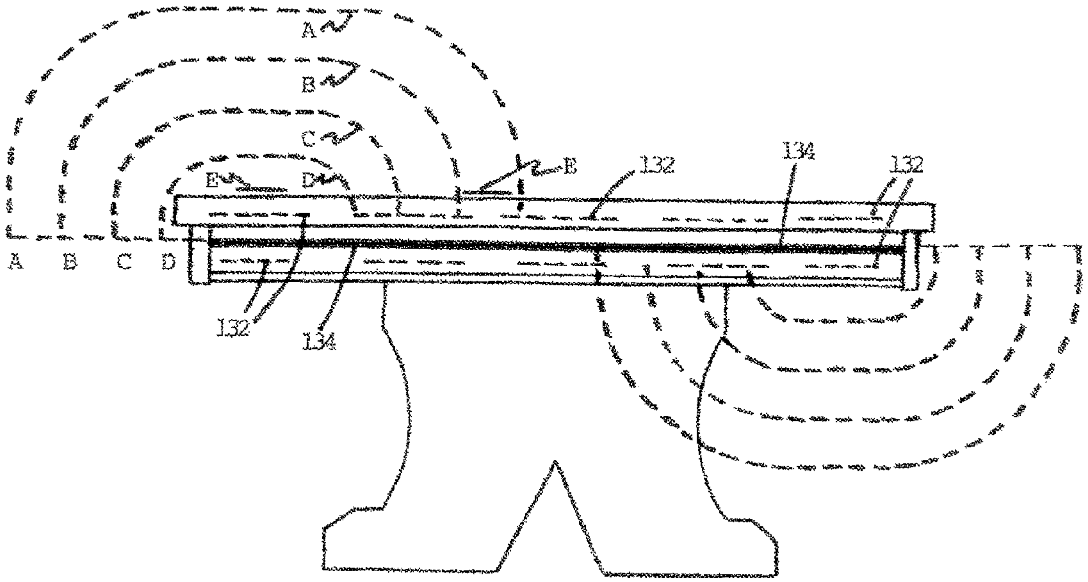
FIG. 13A illustrates a cross-sectional side view of another exemplary embodiment of a smart table system for RF playing cards in accordance with the present invention.
Figure 13B:
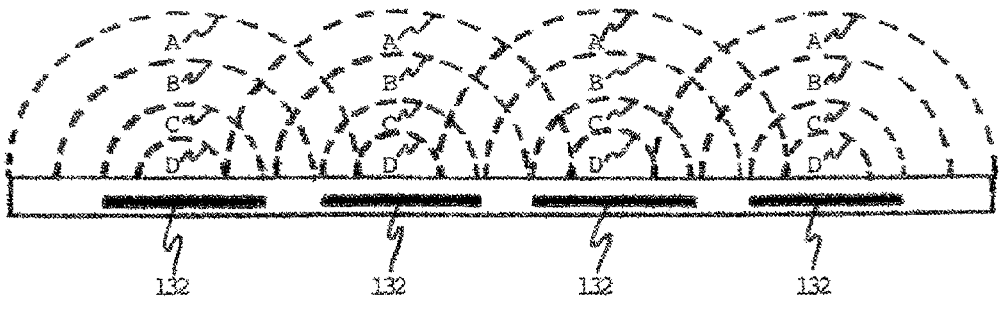
FIG. 13B illustrates a plan view of the smart table system of FIG. 13A in accordance with the present invention.

Similar to FIGS. 6A and 6B, FIGS. 13A and 13B illustrate another exemplary embodiment of the system's use of multiple overlapping detection zones for tracking the location and movement of the cards in relation to the gaming table. In FIG. 13A, a 3D imaging system is shown that preferably uses only a single frequency, such as 13.56 mHz. Each detection zone has a maximum distance at which a card may be read. For example, FIGS. 13A-B illustrate a first maximum reading distance (A), preferably about 16 inches, a secondary reading distance (B), preferably about 12 inches, a tertiary reading distance (C), preferably about 8 inches, and a fourth maximum reading distance (D), preferably about 4 inches. A fifth position of a card (E), can be presumed by the card's non-movement when it has been placed flat on the table.

In FIG. 13A, table antennas 132 have been placed on either side of RF barrier 134. Four distinct detection zones (A), (B), (C), and (D) can be accomplished by alternating four different, diminishing, RF signal transmission levels through a multiplexer or a plurality of multiplexers, as previously discussed. A single transceiver could be used that can transmit a radio frequency signal about every 1/1000 of a second. Alternatively, four transceivers could be used, each transceiver being in sync with one another, and each transceiver transmitting an RF signal at a different wattage.

The effect of such a system is shown in FIG. 13A, where a card's distance from transmitting antenna 132 can be determined. If a card is detected by detection zone (A), and not detection zones (B), (C), and (D), then the system will determine that the card resides between the maximum range of detection zone (A) and the maximum range of detection zone (B). If the system detects the card's presence within both detection zones (A) and (B), but not zones (C) and (D), then the computer would be able to determine that the card has moved from zone (A), to zone (B), and now resides somewhere between the maximum reading range of zone (B) and the maximum reading range of zone (C). If the card is then subsequently detected within zones (C) or (D), it will have been determined to have moved to that position, and its location could be displayed on a monitor screen, as previously discussed.

Since all four varying signals are transmitted almost instantaneously, (approximately every 1/1000 of a second), a card's approximate position can be determined within the maximum transmission range. When determining where a card is located within that range, and when overlapping detection zones are present, the weakest transmission signal able to energize the card, and thus receive a return signal, has priority as to the card's location over the stronger multiplexed transmissions. In other words, it is the identification of the weakest successfully received transmission signal that determines the card's location.

FIG. 13B illustrates that when multiple antennas are placed in close proximity to each other, many overlapping detection zones can be determined by the computer. In this respect, a card's position is not only determined using a single table antenna 132, but rather multiple adjacent table antennas. As a result, a card's horizontal movement and position can be determined.

FIG. 14A illustrates a multitude of detection zones being manifested from the overlapping transmission areas emanating from the five player antennas disposed in a semi-circular fashion and the one dealer antenna located in the gaming table. This illustration shows the detection zones on the flat plane of the table and represents the ability of the detection zones to sense cards laying flat on the table. However, this illustration must be visualized together with FIG. 13B in order to have a sense of the several 3-dimensional detection zones created by this antenna configuration.

FIG. 14B is an overlay of FIG. 14A, focusing only on a specific semicircular section (F) of the game table. This section of the table represents the area where cards are first placed by the dealer when a player is asking for cards, and the area where a player places his cards when he is splitting, doubling-down, or standing.

During the initial deal, each player's dealt hand can be determined since dealt cards will automatically pass over detection zones on and around the table, such as those shown as area (F) in FIG. 14B.

As cards are dealt in a clockwise direction, or from left to right in the illustration, the number of participants at the table can be determined by the system. The diagram shows the perimeter of 34 detection zones (P1-P34) set in an arch, with each detection zone approximately parallel to its adjacent detection zones. These detection zones are created by the antennas, the center of which are represented by reference numeral 136. The four arrows 140A, 140B, 140C, and 140D in the diagram represent four players at the table, and the direction in which each player's cards will be consecutively placed on the table by the dealer. For, example, in FIG. 14B, player (A) may have his first cards placed by the dealer at position P2, and additional cards laid down consecutively in the direction of arrow 140A shown at that position.

The system would then be able to determine that player (A) has finished taking cards, and that player (B) had begun receiving his cards by sensing a card's presence at position P10.

In FIG. 14A, additional cards may then be detected at PIOA, and then PIOB, for example, indicating to the computer, according to the protocol of the game, that player (B) is requiring additional cards.

In FIG. 14B, when a card is detected at P21 for instance, the computer will again be able to determine that a third player is either receiving cards from the dealer, or that he is placing his own two cards on the table at that position. The table would be able to recognize if the two cards placed on the table are the same two cards that were initially dealt to the player. At that time, if cards have been switched or misplayed, an indicator could alert casino personnel.

The player may place his original two cards on the table over section (F), as a double-down, in which case, he would only receive one additional card. If the player intends to split, he would place his cards face-up, side by side in a parallel fashion, at P20 and at P22 for instance. Cards would then be placed on the first hand in the direction of the arrow 140C. The computer would be able to recognize that additional cards are being applied to the first hand by their placement, or location on the game table.

When a second card is detected at P22, the computer would know that player (C) has finished applying cards to his first hand, and that additional cards received would be applied to his second hand.

If a player places his original two cards under his bet, indicating that he does not require additional cards, the system would detect the two cards, but not know their purpose until a card is detected at another position, such as position P32, indicating that player (D) has begun his turn. The system would be able to determine at that time that the two cards placed at P21 by player (C) are placed there to indicate that player (C) is finished taking additional cards.

In FIG. 14A, it is important to note that the number of player antennas, in this case five, do not necessarily correspond to the number of player positions for which a specific gaming table is designed. This antenna arrangement will work just as well on a six or seven player table, and can accommodate any number of players sitting at the table. The position of the antennas are not intended to correspond to the player positions, but rather to cover the entire table with overlapping detection zones in order to achieve the ability of a 3D sensor system.

Figure 15:
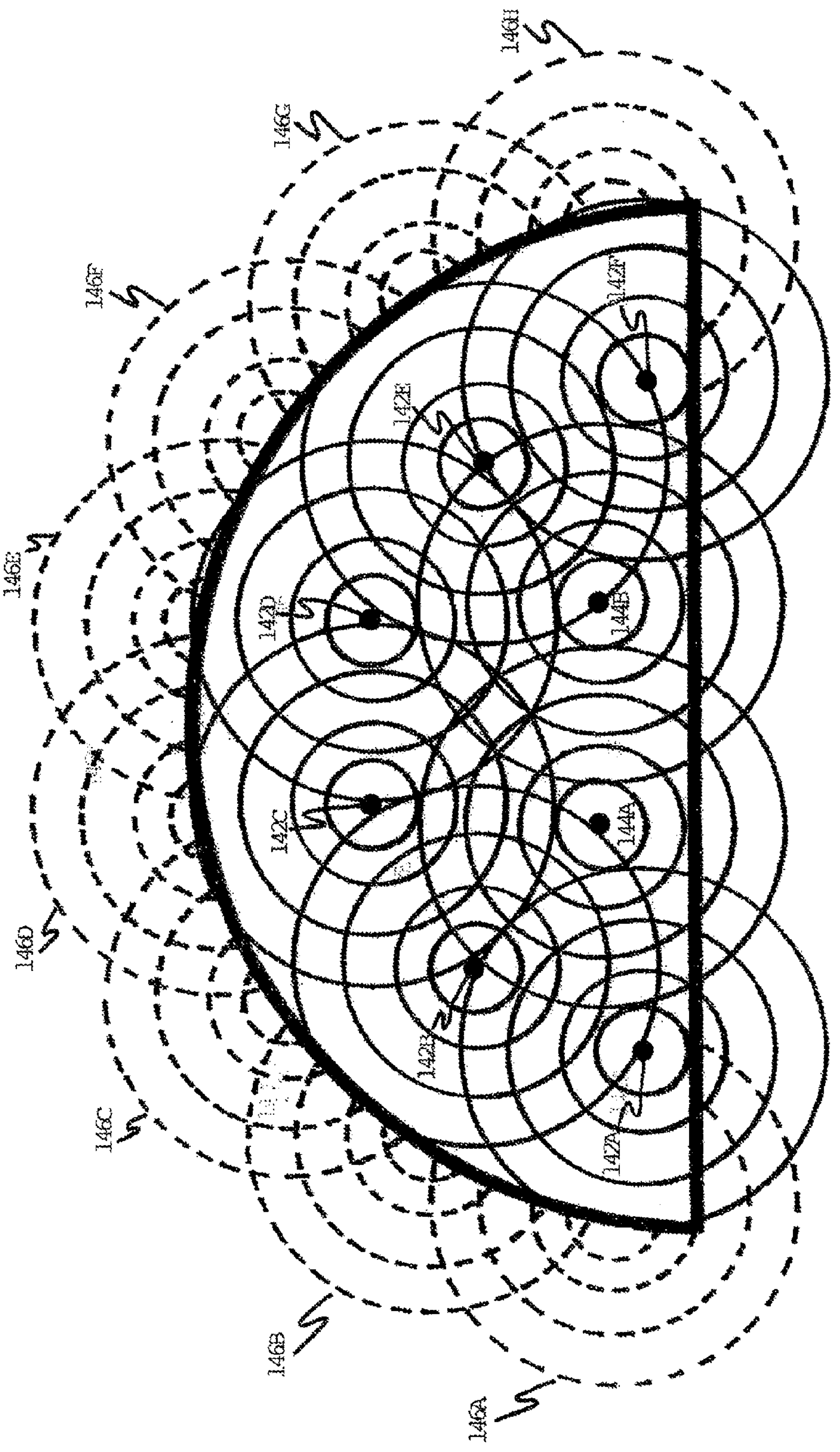
FIG. 15 is an illustration of an exemplary three-dimensional, radio frequency, card sensing system in accordance with the present invention.

FIG. 15 is an illustration of a complete three-dimensional, radio frequency, card sensing system. The diagram shows diminishing detection zones emanating from six player antennas 142A-F and two dealer antennas 144 A-B, enabling the system to detect a card's position on or above the game table, and eight groupings of perimeter antennas having emanating signals 146A-H, that are used to detect a card's position under the table or outside the bounds of the table area. The perimeter antennas may also be able to read in an upwards direction around the outside of the table so as to be able to detect a card in a player's shirt pocket for instance. Diminishing and overlapping detection zones can also be achieved under the table, around the perimeter of the table, and at each player position.

The 3D radio frequency system of the present invention, such as the one shown in FIG. 15, can detect cards being dealt from a hand-dealt deck, as well as cards being dealt from an ordinary casino shoe.

The 3D system of the present invention provides casino personnel with the ability to see on a monitor screen: cards as they are being dealt across the table, cards placed on the table by the dealer or the players, cards held off the table by the participants, and cards being illegally traded or substituted by the players.

Figure 16:
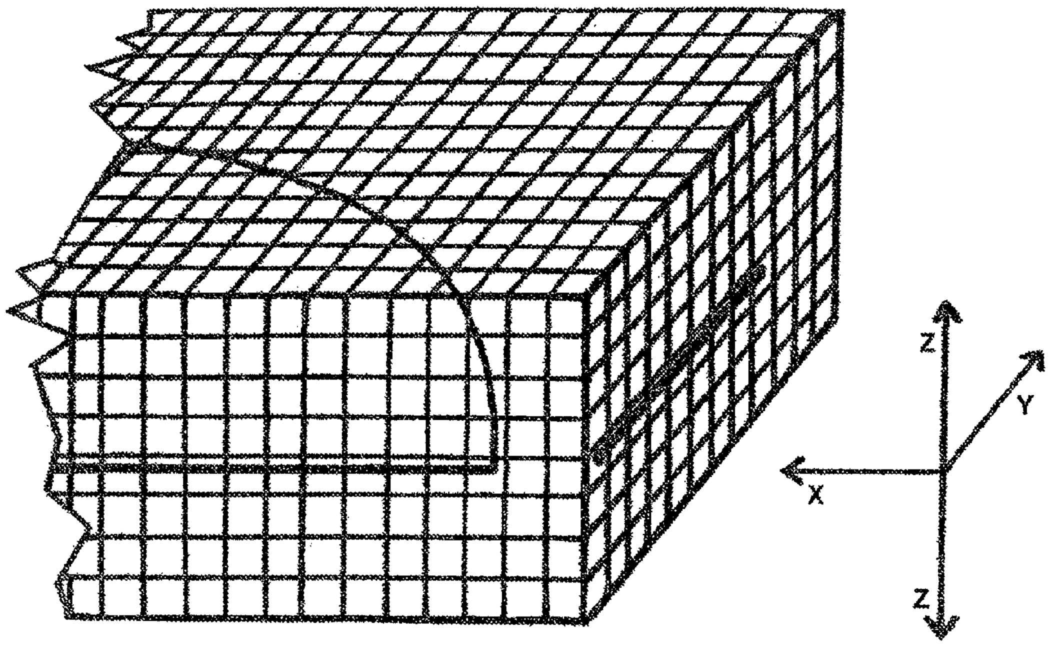
FIG. 16 illustrates an exemplary embodiment of how the RF system of the present invention senses card activity in a three-dimensional perspective.

The multitude of irregular detection zones illustrated in FIG. 15, can be transposed to a cubical grid, such as the one shown in FIG. 16. Traditional 3D software can be utilized to display the three-dimensional information on a two-dimensional monitor screen. It is the object of the present invention that table angle and orientation can be manipulated on a monitor screen by casino personnel in order to view card activity from every angle, even from under the table.

The 3D smart table shown in FIG. 15 could be used for the game of Blackjack, or it could be used for any number of player-versus-dealer casino card games, including, but not limited to, Baccarat, Let It Ride, Pai Gow, Three Card Poker, and Acey-Ducey.

Card orientation, such as whether a card laying flat on the table is laid parallel to the X axis in FIG. 16, or whether it is laid parallel to the Y axis in the diagram, can only be assumed by the system according to game protocol. Software can be developed specifically for each game which will display the proper orientation of the cards as they are laid flat on the table by the participants.

Cards placed flat on the table may be represented in the flat position on the monitor screen, and cards detected as being in movement may be represented in the vertical position. Card movement from position to position may be shown as well. The movement of cards from position to position may be buffered by the system software in order to achieve a more realistic, fluid movement of cards on the monitor screen.

The RF card detection system can monitor a casino card game and provide a record of game table and card movement activity. The RF system may then combine the recorded information with video obtained from video cameras monitoring the table in order to provide a complete picture and record of any illegal card trading activity.

FIG. 16 shows that the RF system senses card activity in a three-dimensional perspective, sensing a cards position on the X and Y axis, as well as the Z axis. The dark bar at the side of the grid represents the game table's orientation within the grid.

It is contemplated that this concept of using diminishing and overlapping detection zones to create a 3-dimensional sensor effect may be applied to the smart table system of FIG. 5 as well. The table system of FIG. 5 was described as having twenty-eight antenna positions, each with a maximum detection zone of about 14 inches, in order to read cards as they are being dealt across the table, and a secondary detection zone with a range of about one or two inches, for reading cards that are laying flat on the table. This antenna arrangement may employ the 3-dimensional sensor system, with four or more diminishing detection zones at each antenna location and several overlapping detection zones across the table.

Figure 17:
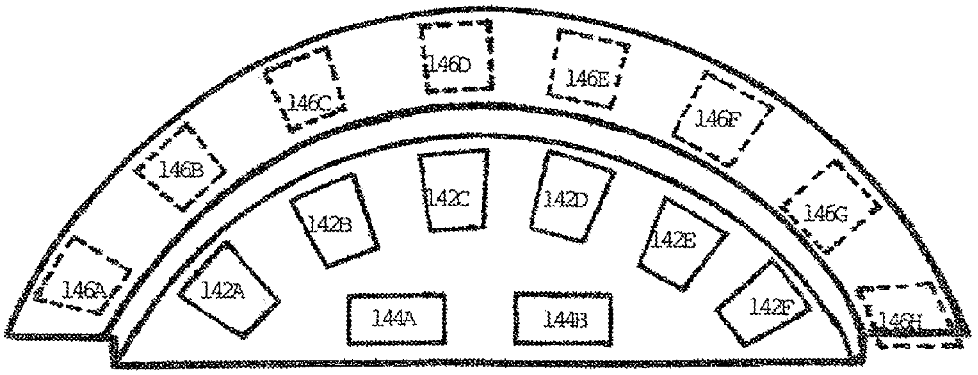
FIG. 17 illustrates an exemplary chassis or substrate to which the antennas may be secured in accordance with the present invention.

FIG. 17 illustrates a chassis or substrate to which the antennas may be secured. The antennas are placed as shown in FIG. 15, with six player antennas 142A-F and two dealer antennas 144A-B that are able to read cards on and above the table, as well as eight perimeter antennas 146A-H that are able to detect cards below the table and outside the perimeter of the table. In order to segregate detection zones above the table from detection zones below the table, an RF signal blocking material may be used. The substrate itself may be composed of an RF signal blocking material, or an RF signal blocking material may be positioned above or below each antenna individually.

One method of blocking radio energy from traveling in a particular direction is to incorporate a material having RF absorption capabilities above or below each antenna, such as an electromagnetic field suppressor. One example of such an electromagnetic field suppressor is found in U.S. Pat. No. 6,514,428, the contents of which are hereby incorporated by reference as if set forth herein. It can function as a barrier by absorbing radio waves from 10 MHz to 100 GHz.

The antennas in FIG. 17 may be embedded in a Styrofoam sheet about an inch thick. The Styrofoam sheet may be molded to form a runway where 50 ohm antenna cable can be coiled at each antenna position. The antennas may be held in place and the entire apparatus stiffened by applying epoxy resin over the coiled antennas and across the back of the Styrofoam sheet.

The finished product is preferably about one inch thick, sits on top of the table surface, and can be custom cut to retrofit existing tables. Custom casino felt cloth is than applied over the Styrofoam sheet and it is held in place by the table's perimeter cushion.

The three-dimensional effect created by overlapping, diminishing detection zones, can be adequately achieved by varying the wattage of the outgoing signal emanating from the transceiver antenna. However, an alternate method of creating this 3D effect could be employed.

Figure 19:
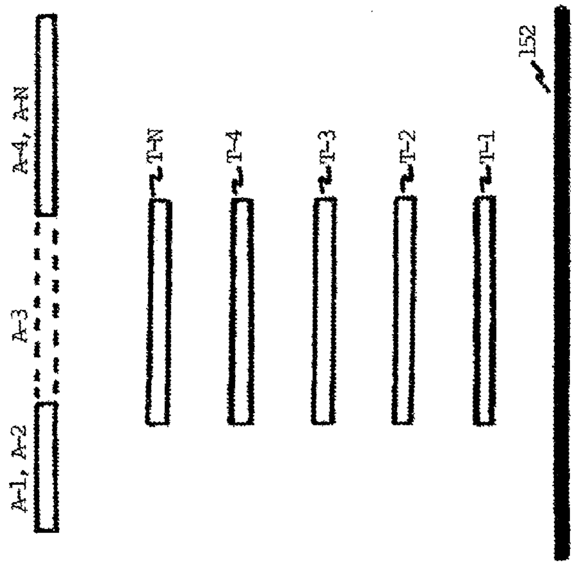
FIG. 19 is an exploded side view of an exemplary RFID tag III accordance with the present invention.
Figure 18:
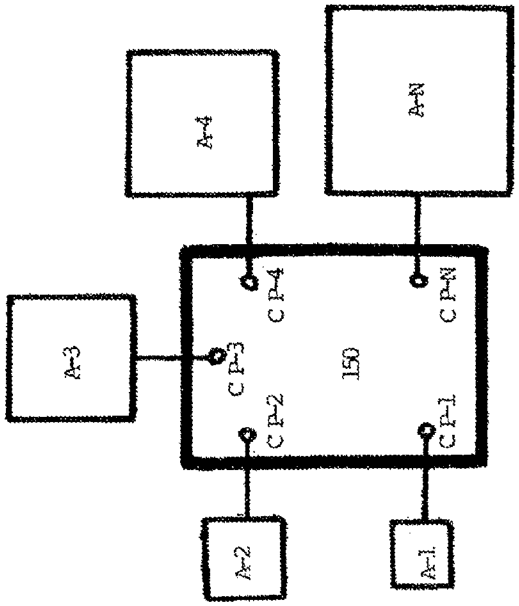
FIG. 18 is an exploded plan view of an exemplary RFID tag III accordance with the present invention.

FIG. 18 shows a three-dimensional RFID tag 150 that can be used with a traditional transceiver, transmitting radio energy at a single frequency, or a single power level. The tag consists of a plurality of transponders imprinted on top of one another as is illustrated in FIG. 19. This diagram shows a number N, of transponders imprinted on substrate 152 in succession, with an antenna layer (A-1 through A-N) imprinted above the imprinted transponder layers (T-1 through T-N). However, it is contemplated that the antenna layer may be imprinted anywhere between or beneath the transponder layers. A fill-in insulating layer (not shown) may be imprinted between all transponder layers, and between the antenna layer and any adjacent transponder layers. Each layer shown consists of several imprinted layers which may have conductive, semi-conductive, dielectric, or insulating properties. The antenna layer and transponder layers may be imprinted on the substrate in any order as long as a contact point is provided between each transponder and its corresponding antenna. At this point, the antenna and transponder circuitry are imprinted over one another, and contact is established between them. FIG. 18 shows that a contact point is provided (CP-1 through CP-N) for each transponder present (T-1 through T-N) within the perimeter of the imprinted transponders. However, it is contemplated that the contact point may be located outside the perimeter of the transponders as well. During the printing process, all antennas (A-1 through A-N) may be imprinted at the same time.

Antenna one (A-1) in FIG. 18 is substantially smaller (in volume of conductive material applied or in exposed antenna surface area) than antenna two (A-2), which in turn is substantially smaller than antenna three (A-3), and so on, with antenna N (A-N) having the greatest antenna surface area or volume of conductive material in its make-up.

Figure 20:
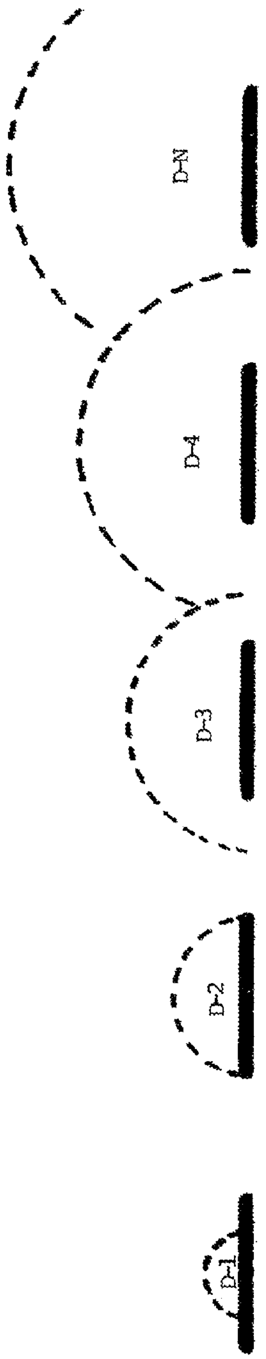
FIG. 20 illustrates an exemplary embodiment of the detection zones corresponding to each RFID tag antenna in accordance with the present invention.

FIG. 20 is an illustration showing the detection zones (D-1 through D-N) created by each corresponding antenna (A-1 thru A-N). It can be seen that an imprinted transponder incorporating a large antenna, containing a greater surface area or volume of conductive material, can be detected at a further distance from the table antenna, than the transponder with the smaller antenna.

In an alternate method, antennas (A-1 through A-N) do not necessarily need to vary their size or volume in order to manifest diminishing detection zones. Each antenna could be of the same size and volume of conductive material. However, the material for each antenna would then have different conductive qualities. For example, antenna one (A-1) may consist of zinc, which has less conductive capacity than antenna three (A-3), which may consist of copper, which in turn may have less conductive capacity than an identical antenna made up of gold. Thus, identical transponders may be imprinted on a substrate and attached to corresponding antennas, with each antenna having a separate RF reception capability, thereby giving the plurality of tags attached to an article (in this case, the card) the ability to relay approximate distance information regarding that article to the transceiver.

Another exemplary method of achieving a three-dimensional sensing effect with the tags comprises a design where a plurality of transponders share a common antenna. In this configuration however, the transponders themselves would be imprinted with a superior or inferior material (such as discussed previously), so as to make each transponder require more or less energy in order to begin functioning at a specific distance from the table antenna.

Yet another method for varying the reception capability of the tags would be to either increase or decrease the length of each of the tags antenna, or to increase or decrease the number of coils, or wraps, of each tag's antenna.

In order to create a three-dimensional card sensing system at a gaming table, any of the aforementioned methods may be employed, or a combination of methods may be used.

Figures 21A, 21B, 22A, 22B, 23A, 23B:
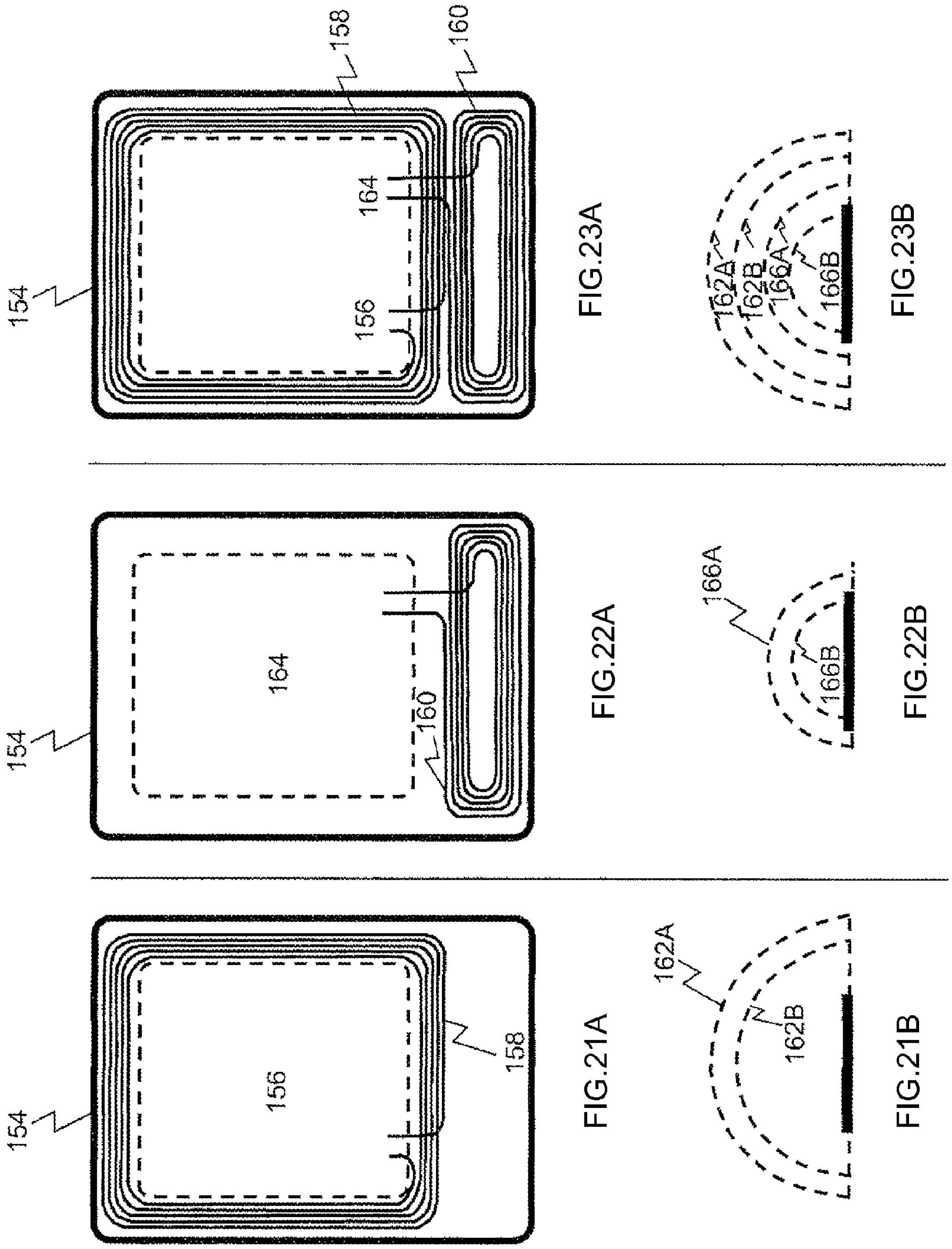
FIG. 21A illustrates a playing card having an exemplary imprinted transponder and antenna design.
FIG. 21B illustrates detection zones corresponding to the exemplary design of FIG. 21A.
FIG. 22A illustrates a playing card having another exemplary imprinted transponder and antenna design.
FIG. 22B illustrates detection zones corresponding to the exemplary design of FIG. 22A.
FIG. 23A illustrates a playing card having yet another exemplary imprinted transponder and antenna design.
FIG. 23B illustrates detection zones corresponding to the exemplary design of FIG. 23A.

FIG. 21A illustrates a playing card 154 having an imprinted transponder 156, represented by the dashed lines making up the center rectangle, and an antenna 158 coiled around its perimeter. If this tag design is used with a transceiver that transmits RF energy from the table antennas at two different wattage levels, the effect can be seen in FIG. 21B where detection zone 162A, represents an area that can detect the tag when the transceiver is transmitting at full power, and detection zone 162B, represents an area that can detect the tag when the transceiver is transmitting at a level somewhat less than full power.

FIG. 22A represents a transponder 164 imprinted on a card 154 with a substantially smaller antenna 160. The smaller antenna shown in FIG. 22A may be detected within detection zones 166A and 166B shown in FIG. 22B. Detection zone 166A could be achieved by a transceiver transmitting at full power, and detection zone 166B could be achieved by a transceiver transmitting at a level somewhat less than full power.

FIG. 23A illustrates that a card 154 may be imprinted with two transponders in the manner previously discussed, with one transponder 156 attached to a large antenna 158 and one transponder 164 attached to a smaller antenna 160. When two varying transmission levels are applied, four distinct detection zones can be manifested, as shown in FIG. 23B. The transponders and antennas may be imprinted on the same side of the card, or each RF tag may be imprinted on opposite sides on the card substrate.

In order for a table antenna to read all 416 transponders in a casino shoe, an alternate method for configuring the transponders on the playing cards may be employed. According to an article entitled "RFID 'Powder'—World's Smallest RFID Tag" found at www dot technology dot com. Hitachi has manufactured a transponder measuring only 0.05×0.05 millimeters. In accordance with the present invention, these nano-transponders can be specifically placed within the paper mesh material that most cards are made from, or as when a plastic card substrate is used, a small hole may be bored or punched into the card substrate. The nano-transponder and antenna would be placed within the hole, and then it would be filled with an appropriate material. A textured, plastic coating may be applied before the printing of the front and back indicia. In one embodiment, the surface of a card may be compressed by a needle-like device, and the nano-transponder may be inserted. The card would then be repaired. These nano-sized transponders may have a 128-bit ROM for storing a 38-digit serial number, and a maximum reading distance of approximately seven to ten inches.

Figure 24:
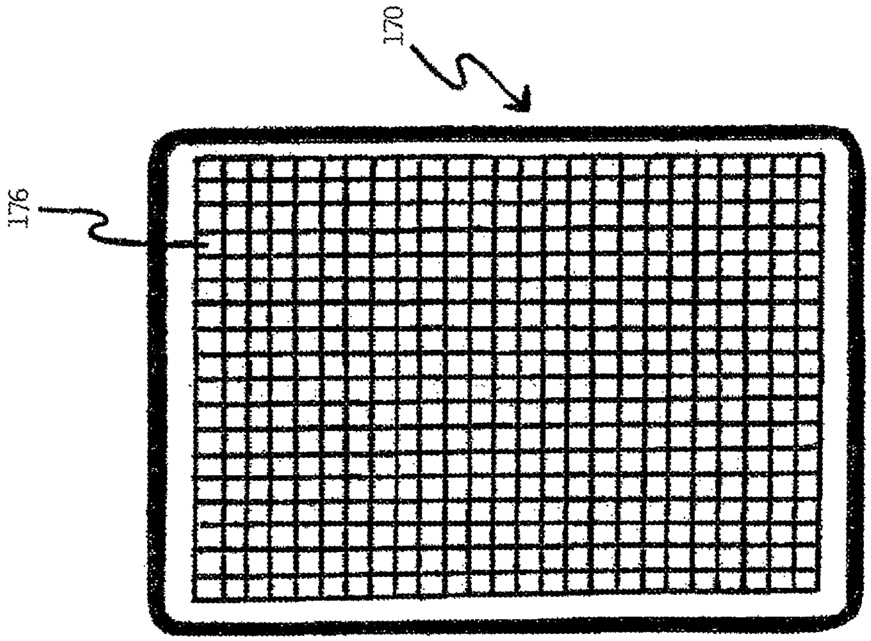
FIG. 24 is a plan view illustrating an exemplary RFID tag design employing nano-transponders in accordance with the present invention.

FIG. 24 is an illustration showing a stack of 416 cards 170 employing an exemplary nano-transponder configuration in accordance with the present invention. The grid drawn on the stack of cards represents a different position 176 for each nano-sized RF tag that would be placed in each card in the stack of 416. In this manner, the stack of 416 cards 170 can be placed in a regular casino shoe and all of the cards can be read simultaneously by a RF antenna located in the gaming table.

Therefore, the system can perform an automatic "deck-check" when cards are first put into the shoe, and throughout the game. The computer system can determine cards that are dealt from the shoe by their absence, and in games where the dealing process is a known constant, apply those dealt cards to a player's position or dealer's position on the monitor screen. The system can determine when a dealer is dealing out the player's and dealers first two cards by the pace of the deal. After the deal, a short lull in the pace will occur as the dealer deals to each player individually. Thus, the system can determine the number of players at a table and apply dealt cards to the proper participants. It can also determine and display the favorability of the remaining cards in the shoe, or make another betting calculation.

The system will be able to detect the presence or absence of cards in a deck, or shoe, that is being used in a casino game by utilizing electronic cards. After the dealer collects the cards and shuffles the deck, he could make a "security check" of the deck by dropping his hand (with the deck in it) within about 4 or 5 inches from the gaming table. A screening device located under the table will detect if the deck is missing any cards and then signal security or the dealer if a problem arises. This system would also be able to identify which card or cards were taken out of the deck.

Figure 25:
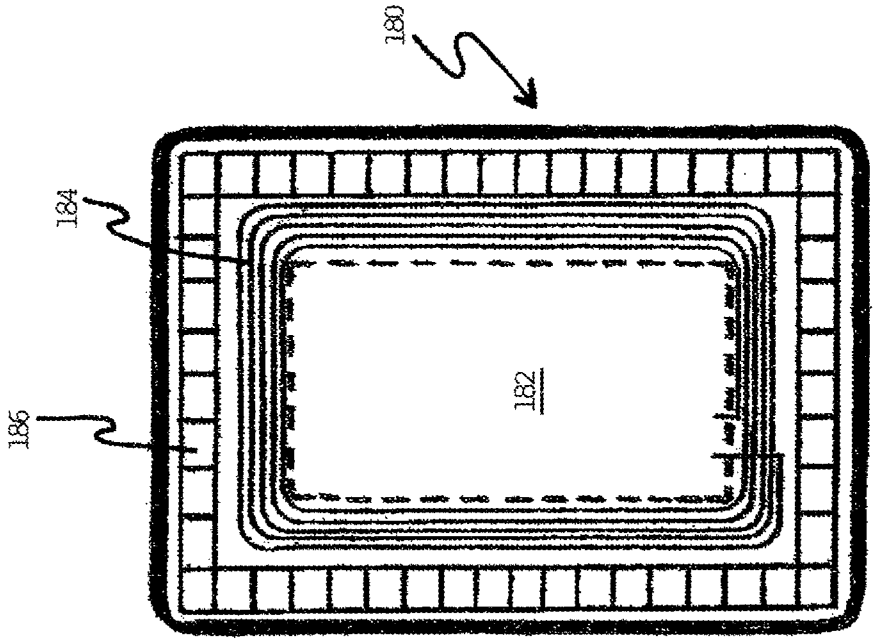
FIG. 25 is a plan view illustrating another exemplary RFID tag design employing nano-transponders in accordance with the present invention.

FIG. 25 is an illustration showing a stack of 56 cards 180. The center rectangle drawn in dashed lines represents where an imprinted transponder 182 would be located on all 56 cards in the stack 180. The antenna coil 184 encompassing the transponder would also be imprinted in the same location on each card. The response signal from an imprinted tag on a particular card would be linked by the computer processor to that card.

Around the perimeter of the card shown in FIG. 25 may be disposed 56 small squares 186, with each square 186 representing an area where nano-sized RF tags can be positioned on each card in the deck 180. Each of the 56 cards would position their identifying nano-transponder and antenna in one of the squares, with each card in the deck 180 positioning their tag in a different square or location. The response signal from the nano-transponder is also linked to the card by the computer processor. Each card has two RF tags that are linked to the card to which they have been attached. Each tag on the card sends a different signal response from the other tag on the card, and from the other tags attached to the rest of the cards in the deck 180.

When the cards are being used at the gaming table, the nano-transponders can be read at approximately 7 inches from the table antenna when RF energy is transmitted at full power. The nano-transponders can also be read at about 3½ inches when RF energy is transmitted at somewhat less than full power.

The imprinted RF tag located in the middle of each card can be read up to about 14 inches when the transmitter is transmitting RF energy at full power. It could also be read at about 10½ inches when the transmitter is transmitting at somewhat less than full power. By alternating two separate transmission signals of varying power, and multiplexing the signals to the table antennas every 1⁄1000 of a second, four separate, diminishing detection zones can be manifested.

Thus, this hybrid RF card design shown in FIG. 25 can be used with the 3D imaging system, while the nano-sized transponders located around the perimeter of each card, allow each card in the deck to be read simultaneously when stacked, or when placed within the manufacturer's carton.

It is contemplated that the phrase "gaming table" used in the present disclosure may include a gaming table adapter that can be added to and removed from an existing gaming table.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A radio frequency card tracking system for a gaming table comprising:

a system computer;

a deck of hand held playing cards;

wherein each card in the deck of hand held playing cards comprises:

a card antenna;

a card identity; and a radio frequency transponder configured to transmit a unique card identifying radio frequency signal associated with the card identity using the card antenna when the card antenna receives a radio-frequency-energizing signal;

a table antenna configured to:

manifest a detection zone located at and above a dealer's card placement position at the gaming table;

transmit a plurality of radio-frequency-energizing signals and receive a plurality of unique card identifying radio frequency signals to and from each card located within the detection zone as each card is dealt over the table antenna from the deck of hand held playing cards, said deck being held by the dealer when the dealer is dealing; and a transceiver operably coupled with the table antenna and the system computer, the transceiver configured to:

provide the plurality of radio-frequency-energizing signals to the table antenna for transmission to each card located within the detection zone as each card is dealt over the table antenna;

receive the plurality of unique card identifying radio frequency signals from the table antenna; and transfer the plurality of unique card identifying radio frequency signals received from the table antenna to the system computer;

wherein the system computer is configured to receive the plurality of unique card identifying radio frequency signals from the transceiver;

wherein the system computer comprises;

a processor; and a program storage device comprising a non-transitory storage medium embodying a program of instructions executable by the processor to:

register the plurality of unique card identifying radio frequency signals received by the system computer;

determine the card identity associated with the plurality of unique card identifying radio frequency signals;

distinguish between when any card is dealt across the detection zone or when such card has been placed flat on the table within the detection zone by a duration of the unique card identifying radio frequency signals transmitted from such card when said card is within the detection zone, the signal duration determined by tabulating a number of the plurality of unique card identifying radio frequency signals;

determine that any card has been dealt to any player's card placement position by detection of the plurality of unique card identifying radio frequency signals transmitted from such card within a predetermined duration;

determine that any card has been dealt to the dealer's card placement position by detection of the plurality of unique card identifying radio frequency signals transmitted from such card for more than the predetermined duration;

indicate when any card has been dealt to any player's card placement position; and indicate when any card has been dealt to the dealer's card placement position.

2. The system of claim 1, wherein the deck of hand held playing cards comprises a top and a bottom, the system further comprising a cut card able to block radio frequency signals, the cut card placed at the bottom of the deck of hand held playing cards, wherein only a single card is read by the table antenna as the single card is dealt from the deck of hand held playing cards.

3. The system of claim 2, wherein the cut card is constructed from an electromagnetic field absorbing material.

4. The system of claim 1, wherein the program of instructions is further executable by the processor to associate each dealt card with a specific player's card placement position or the dealer's card placement position based upon an order of the cards dealt as detected by the table antenna.

5. A radio frequency card tracking system for a gaming table comprising:

a system computer;

a deck of playing cards;

with each card in the deck of playing cards comprising:

a card antenna;

a card identity; and a radio frequency transponder configured to transmit a unique card identifying radio frequency signal associated with the card identity using the card antenna when the card antenna receives a radio-frequency-energizing signal;

a plurality of table antennas, with each table antenna in the plurality of table antennas configured to:

manifest a detection zone at a table antenna location at and above the gaming table; and transmit a plurality of radio-frequency-energizing signals and receive a plurality of unique card identifying radio frequency signals to and from each card located within each detection zone;

a transceiver operably coupled with the plurality of table antennas and the system computer, the transceiver configured to:

provide a plurality of radio-frequency-energizing signals to each of the plurality of table antennas for transmission to each card located within any detection zone;

receive the plurality of unique card identifying radio frequency signals transmitted from each card located within any detection zone;

transfer the plurality of unique card identifying radio frequency signals received to the system computer;

wherein the system computer is configured to receive the plurality of unique card identifying radio frequency signals from the transceiver;

wherein the system computer comprises;

a processor; and a program storage device comprising a non-transitory storage medium embodying a program of instructions executable by the processor to:

register the plurality of unique card identifying radio frequency signals received by the system computer;

determine each card identity associated with the plurality of unique card identifying radio frequency signals;

distinguish between when any card is dealt across any detection zone or when such card has been placed flat on the table within any detection zone by a duration of the unique card identifying radio frequency signals transmitted from such card when said card is within the detection zone, the signal duration determined by tabulating a number of the plurality of unique card identifying radio frequency signals;

determine that any card has been dealt across any detection zone to any player's card placement position by detection of the unique card identifying radio frequency signals transmitted from such card within a predetermined duration;

determine that any card has been placed flat on the table by detection of the unique card identifying radio frequency signals transmitted from such card within any detection zone for more than the predetermined duration.

6. The system of claim 5, wherein the program of instructions is further executable by the processor to associate any card with a specific player's card placement position based upon an order of cards dealt as detected by the plurality of table antennas.

7. The system of claim 6, wherein the program of instructions is further executable by the processor to determine if any card is located within any detection zone and placed flat on the table, and is one that was initially dealt to the specific player's card placement position.

8. The system of claim 7, wherein the program of instructions is further executable by the processor to initiate an indicator to alert casino personnel when any card has been switched or misplayed.

* * * * *